US012287133B2

(12) United States Patent
Park et al.

(10) Patent No.: US 12,287,133 B2
(45) Date of Patent: Apr. 29, 2025

(54) METHOD FOR CONTROLLING REFRIGERATING SYSTEM USING NON-AZEOTROPIC MIXED REFRIGERANT

(71) Applicant: LG ELECTRONICS INC., Seoul (KR)

(72) Inventors: Yongjoo Park, Seoul (KR); Changho Seo, Seoul (KR); Kyeongyun Kim, Seoul (KR); Minho Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 235 days.

(21) Appl. No.: 17/634,492

(22) PCT Filed: Aug. 20, 2020

(86) PCT No.: PCT/KR2020/011142
§ 371 (c)(1),
(2) Date: Feb. 10, 2022

(87) PCT Pub. No.: WO2021/034136
PCT Pub. Date: Feb. 25, 2021

(65) Prior Publication Data
US 2022/0290900 A1    Sep. 15, 2022

(30) Foreign Application Priority Data

Aug. 21, 2019 (KR) .................. 10-2019-0102354

(51) Int. Cl.
*F25B 5/02* (2006.01)
*C09K 5/04* (2006.01)
(Continued)

(52) U.S. Cl.
CPC ................ *F25B 5/02* (2013.01); *C09K 5/042* (2013.01); *F25B 5/04* (2013.01); *F25B 49/022* (2013.01);
(Continued)

(58) Field of Classification Search
CPC ........................... C09K 5/042; C09K 2205/12; C09K 2205/34; F25B 5/02; F25B 5/04;
(Continued)

(56) References Cited

U.S. PATENT DOCUMENTS 5,931,004 A   8/1999 Yoo et al.
6,253,561 B1 * 7/2001 Imakubo .................. F25B 5/04
                                                            62/158

(Continued)

FOREIGN PATENT DOCUMENTS

JP   09-042817 A   2/1997
JP   H11304328 A  11/1999
(Continued)

*Primary Examiner* — Jonathan Bradford
(74) *Attorney, Agent, or Firm* — Bryan Cave Leighton Paisner LLP

(57) ABSTRACT

A method for controlling a refrigerating system using a non-azeotropic mixed refrigerant is provided. The refrigerating system may include a first evaporator configured to supply cold air to a freezer compartment located upstream and a second evaporator configured to supply cold air to a refrigerating compartment located downstream, based on a flow direction of the non-azeotropic mixed refrigerant. The method may include a first operation comprising operating a compressor, a freezer compartment fan to blow air to the first evaporator, and a refrigerating compartment fan to blow air to the second evaporator; a second operation comprising when the freezer compartment reaches a target temperature or the refrigerating compartment reaches a target temperature, continuously operating the compressor, and stopping the freezer compartment fan or the refrigerating compartment fan corresponding to one of the freezer compartment or the refrigerating compartment that reaches the target temperature; and a third operation comprising when both the freezer compartment and the refrigerating compartment
(Continued)

reach the target temperatures, turning off both of the refrigerating compartment fan and the freezer compartment fan and stopping the compressor.

18 Claims, 14 Drawing Sheets

(51) Int. Cl.
    *F25B 5/04*       (2006.01)
    *F25B 49/02*     (2006.01)
    *F25D 11/02*     (2006.01)

(52) U.S. Cl.
    CPC .......... *F25B 49/025* (2013.01); *F25D 11/022* (2013.01); *C09K 2205/12* (2013.01); *C09K 2205/34* (2013.01); *F25B 2341/062* (2013.01); *F25B 2400/0409* (2013.01); *F25B 2600/0253* (2013.01); *F25B 2600/112* (2013.01); *F25B 2600/2501* (2013.01); *F25B 2700/2104* (2013.01)

(58) Field of Classification Search
    CPC ............... F25B 49/022; F25B 49/025; F25B 2341/062; F25B 2400/0409; F25B 2600/0253; F25B 2600/112; F25B 2600/2501; F25B 2700/2104; F25D 11/022

See application file for complete search history.

(56) References Cited

U.S. PATENT DOCUMENTS

| | | | |
|---|---|---|---|
| 9,932,505 | B2 | 4/2018 | Lindgren et al. |
| 2004/0083743 | A1 | 5/2004 | Suzuki et al. |
| 2013/0111933 | A1* | 5/2013 | Yoon ............. F25D 29/003 62/89 |
| 2013/0327078 | A1 | 12/2013 | Junge | |

FOREIGN PATENT DOCUMENTS

| | | |
|---|---|---|
| KR | 20-0119839 | 7/1998 |
| KR | 10-2013-0050700 A | 5/2013 |
| KR | 20170085936 A | 7/2017 |

* cited by examiner

【Figure 1】
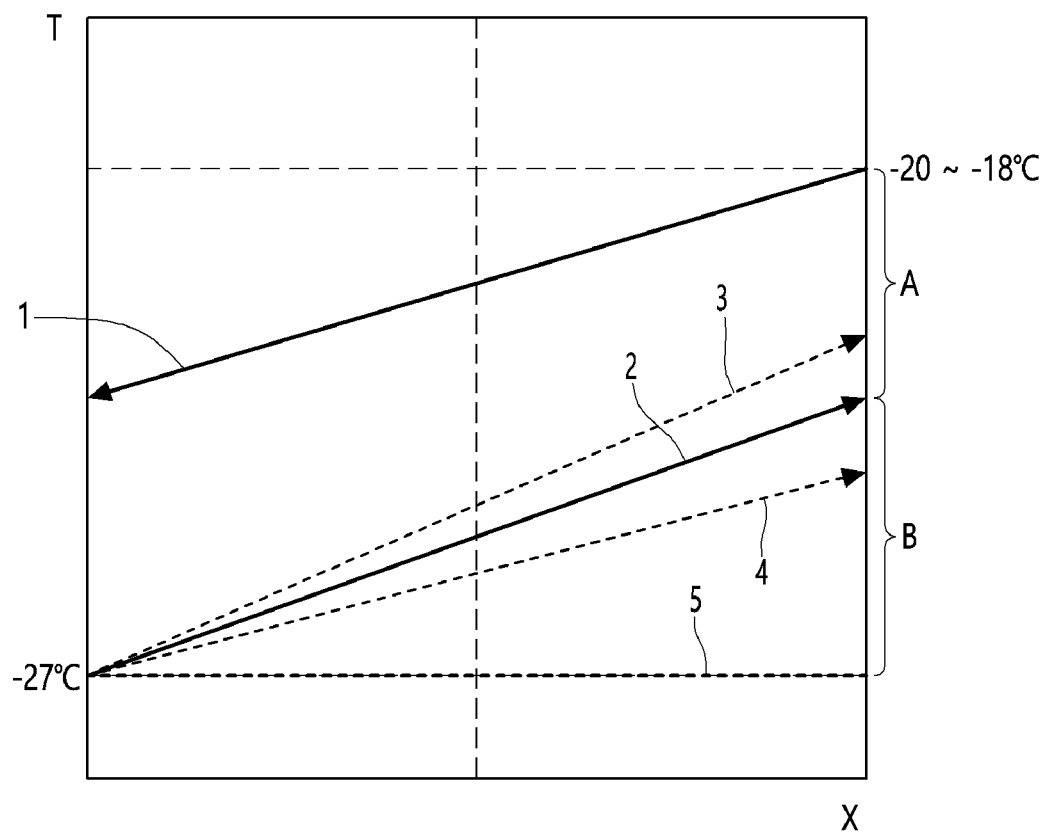

【Figure 2】
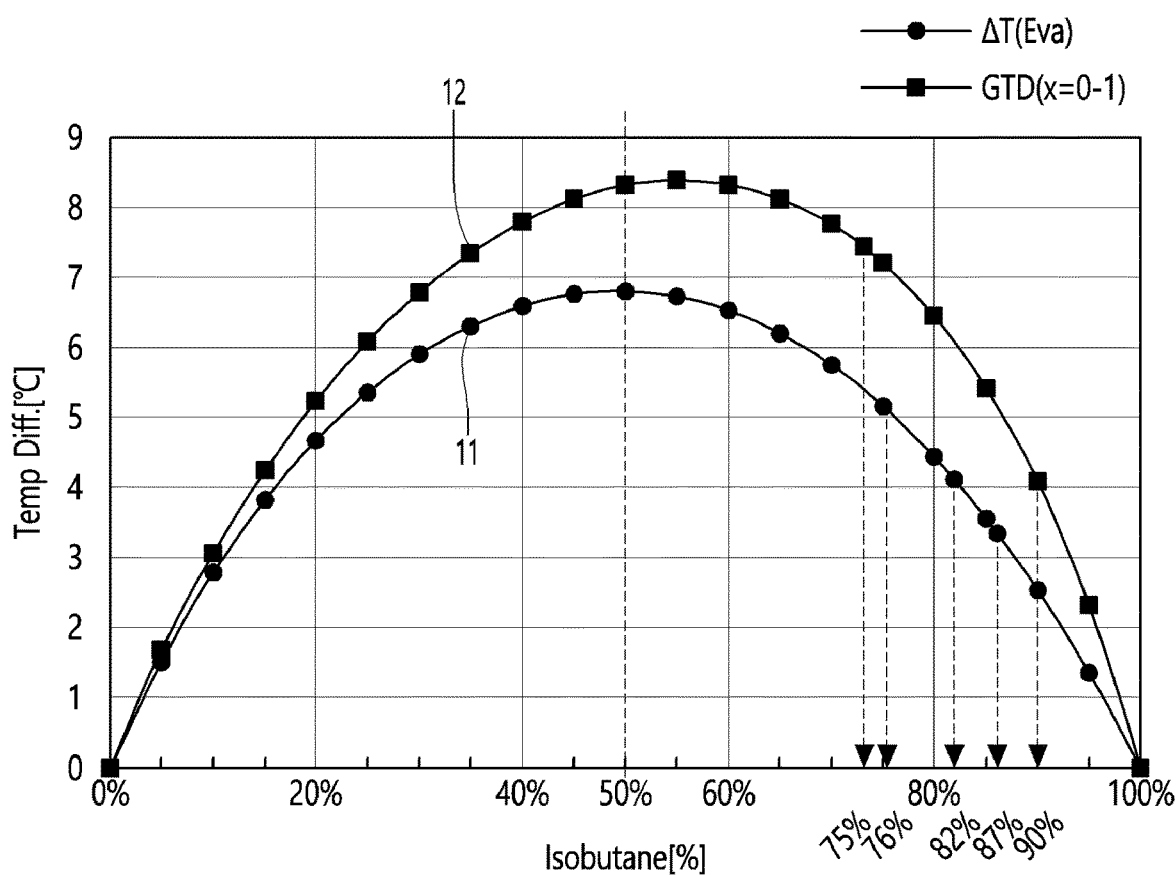

【Figure 3A】
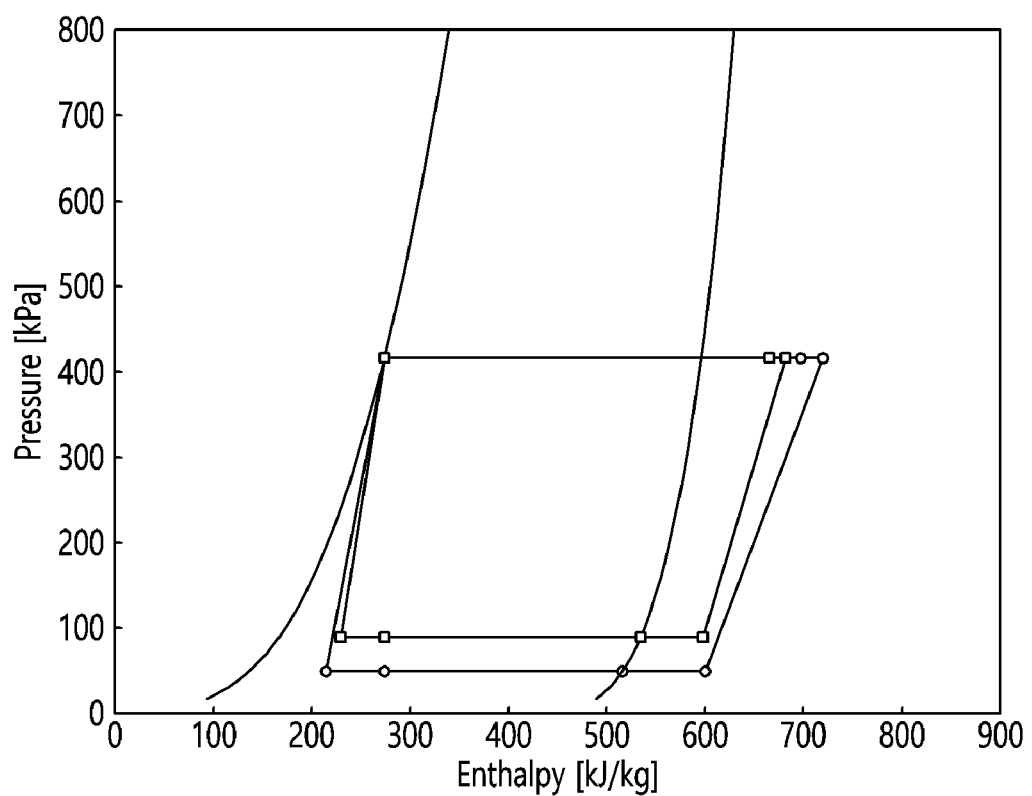

【Figure 3B】
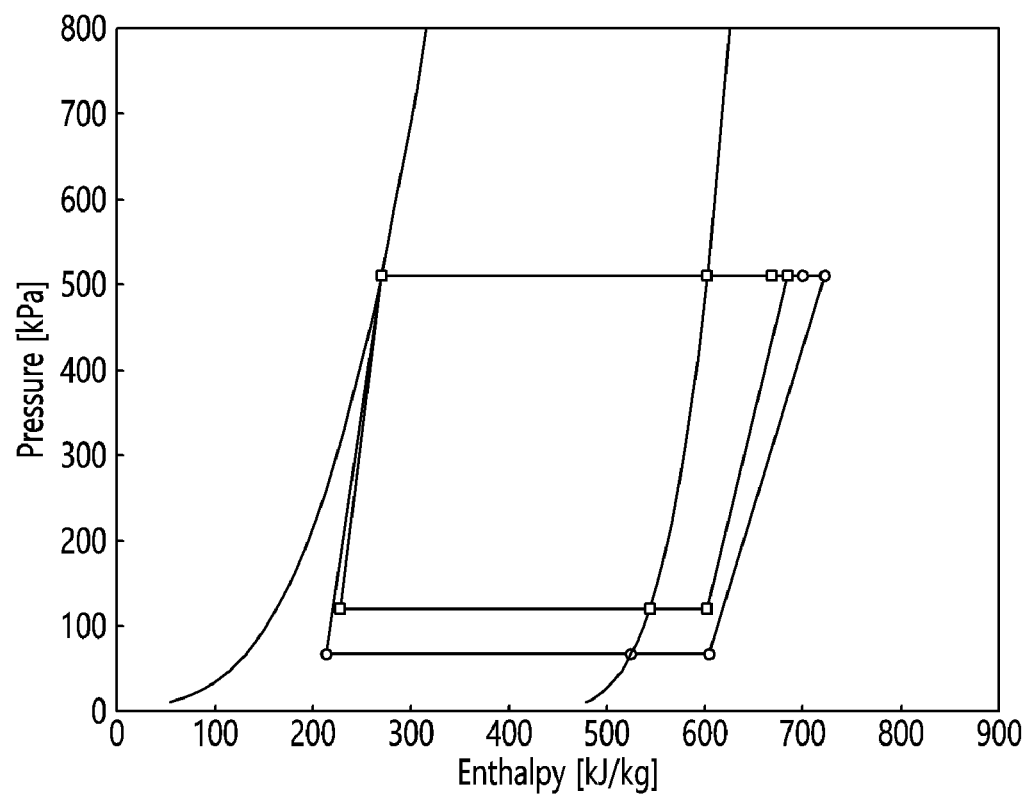

【Figure 4】
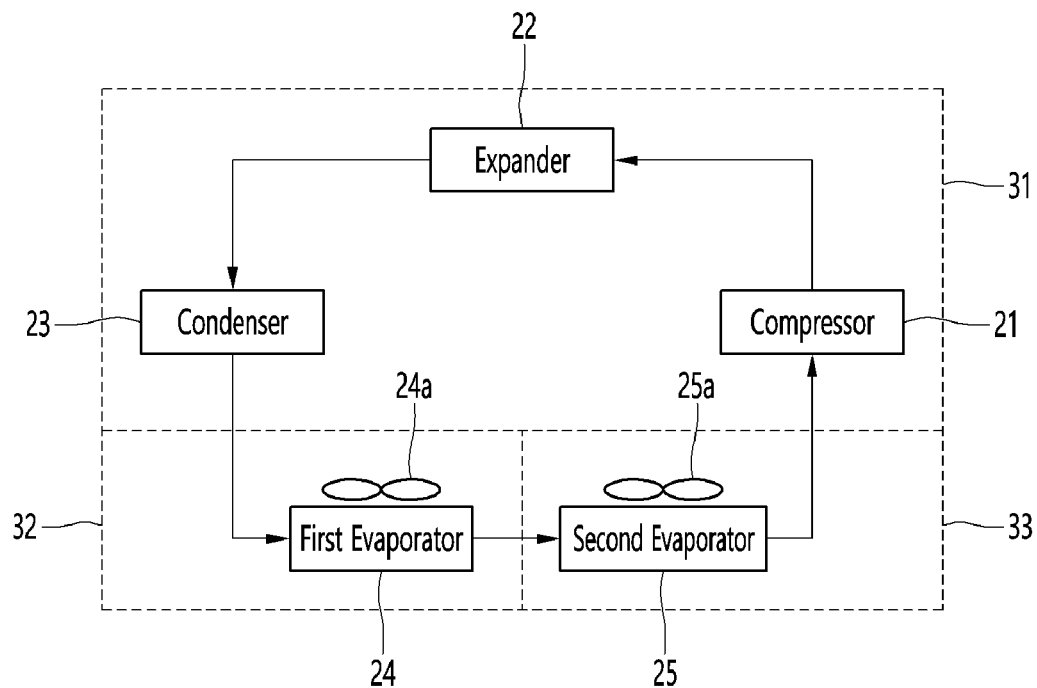

【Figure 5】
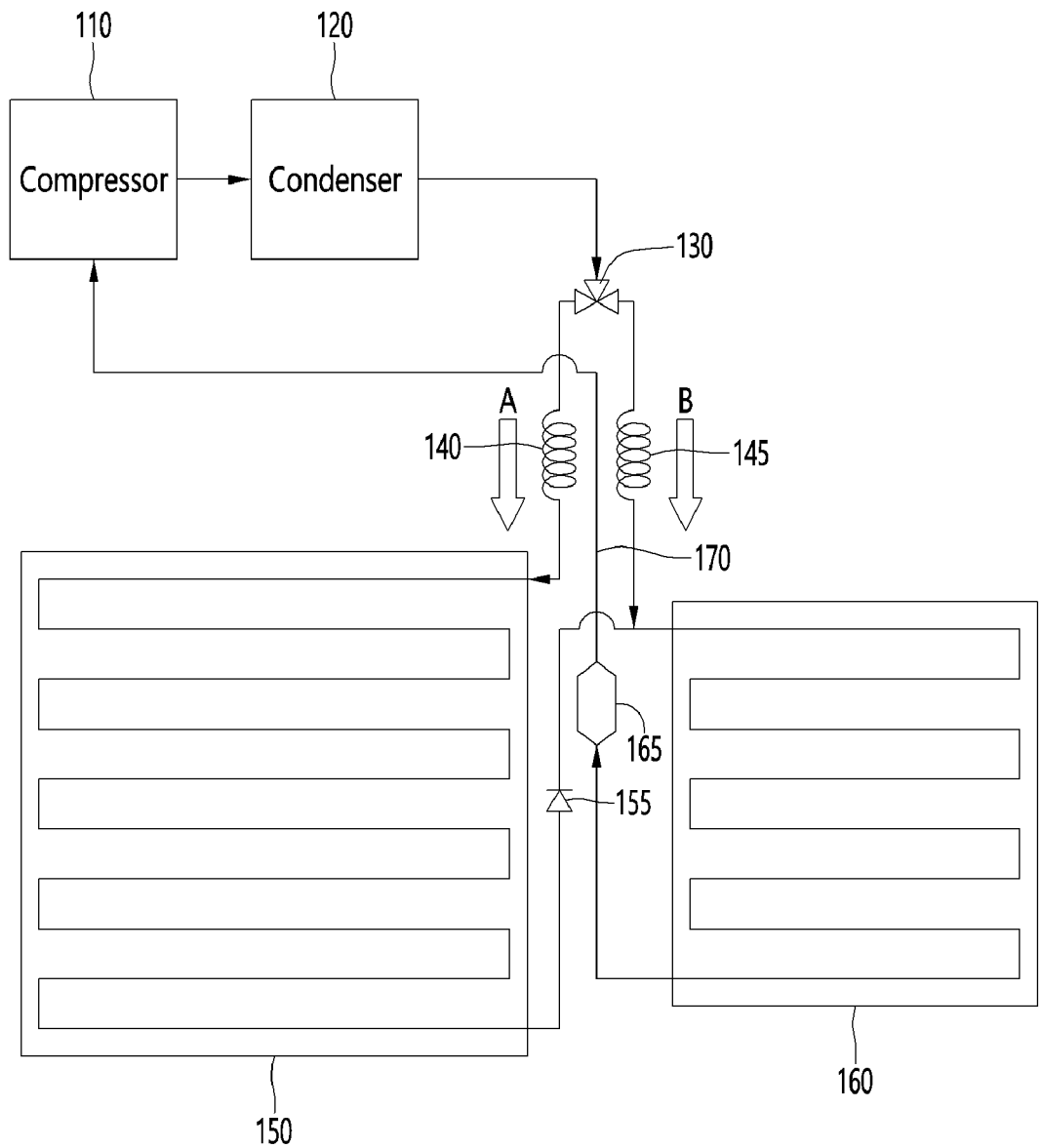

【Figure 6】
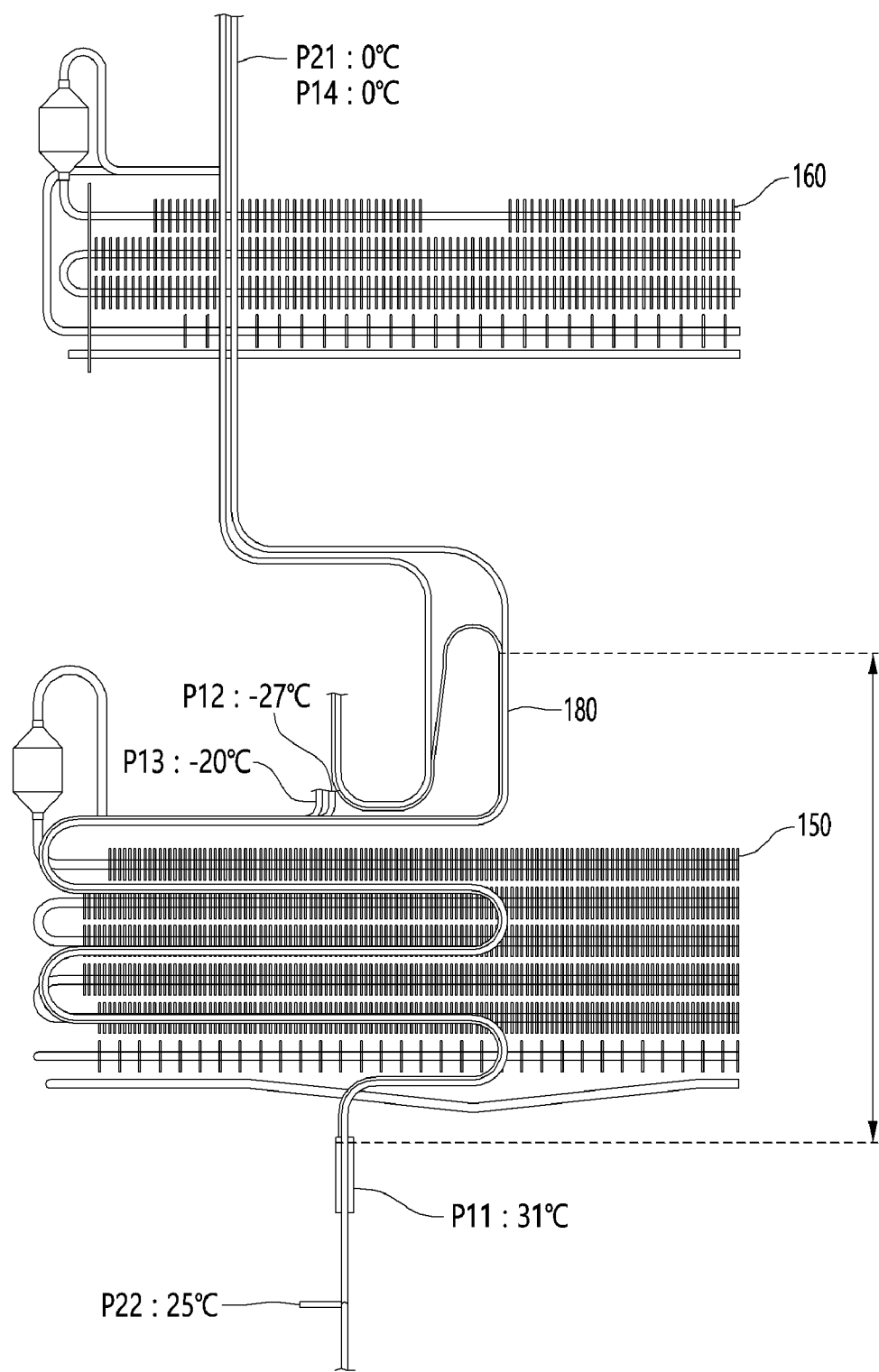

[Figure 7]
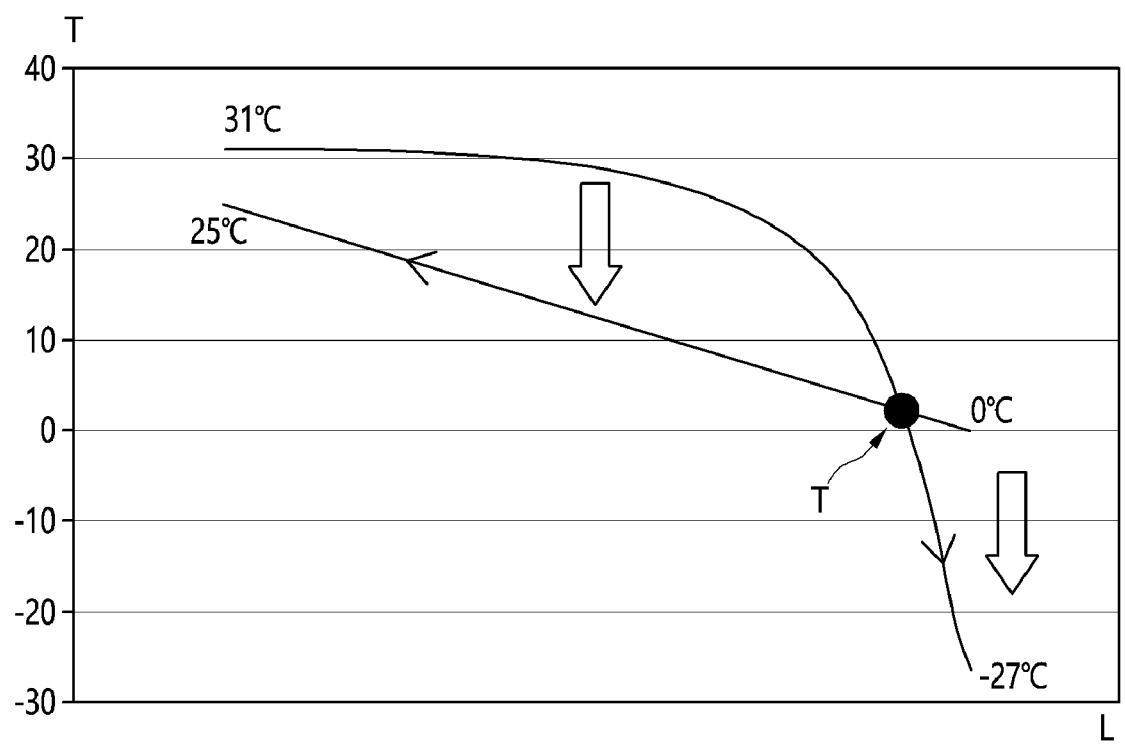

[Figure 8]
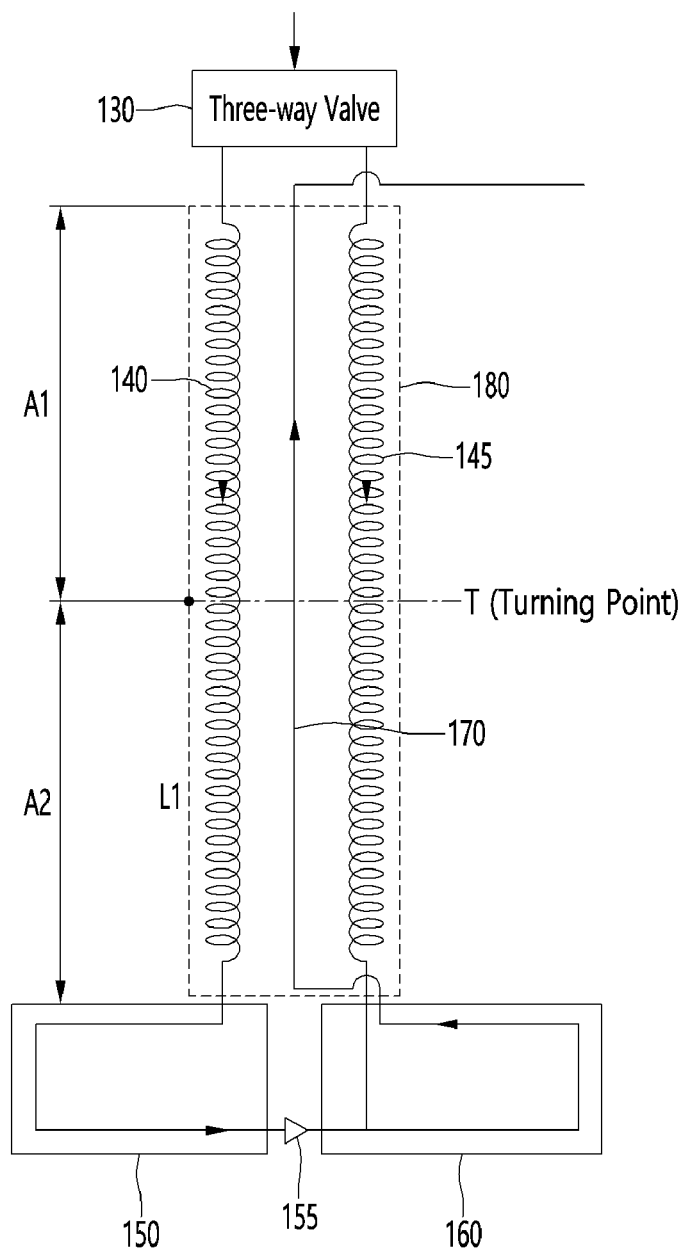

[Figure 9]
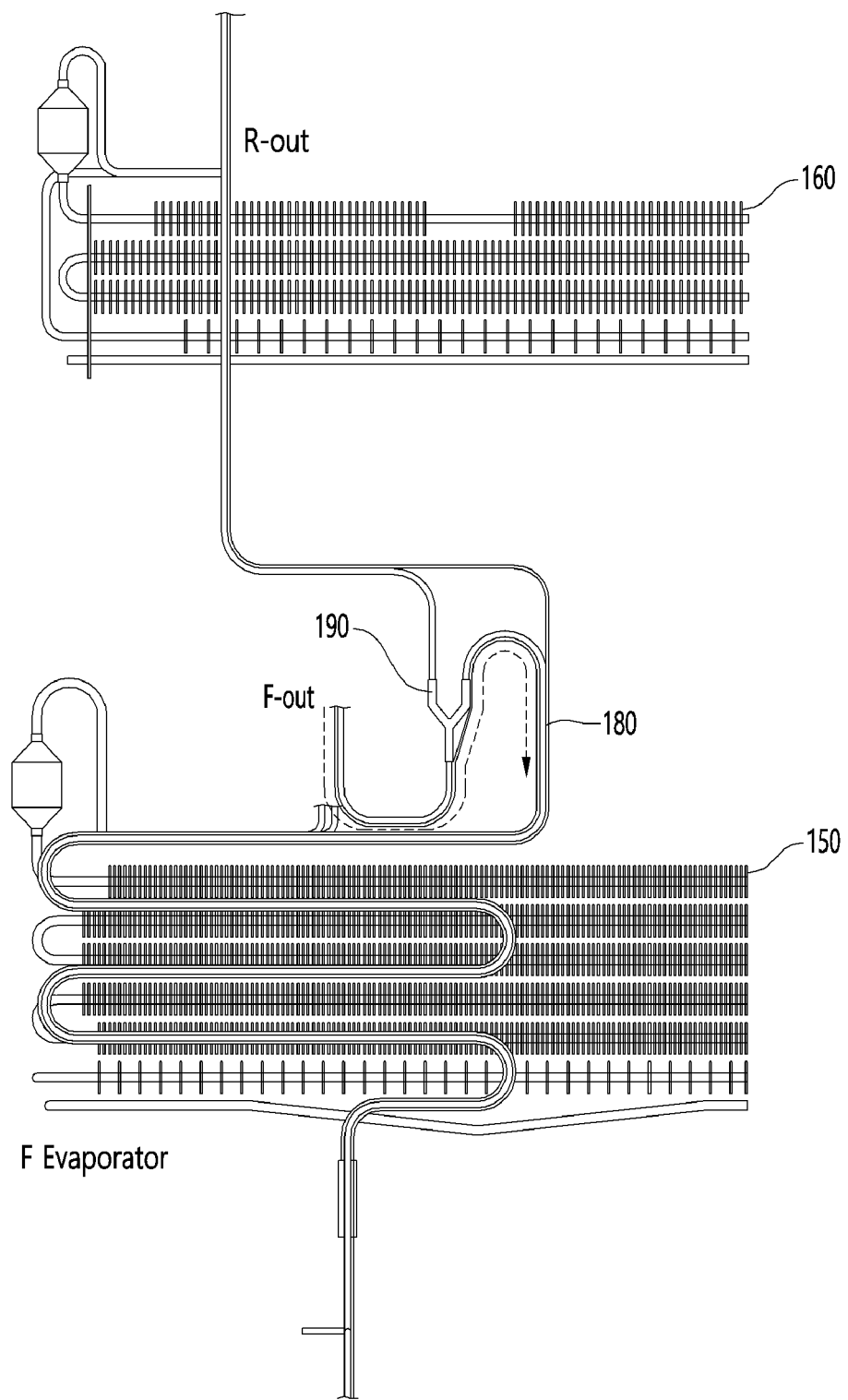

【Figure 10A】
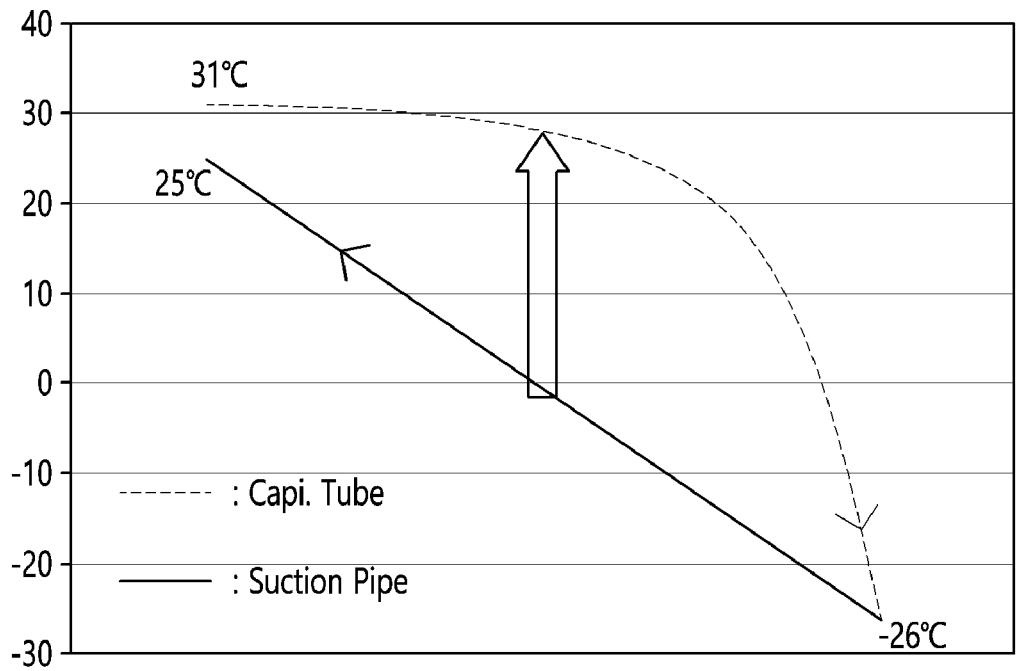
【Figure 10B】
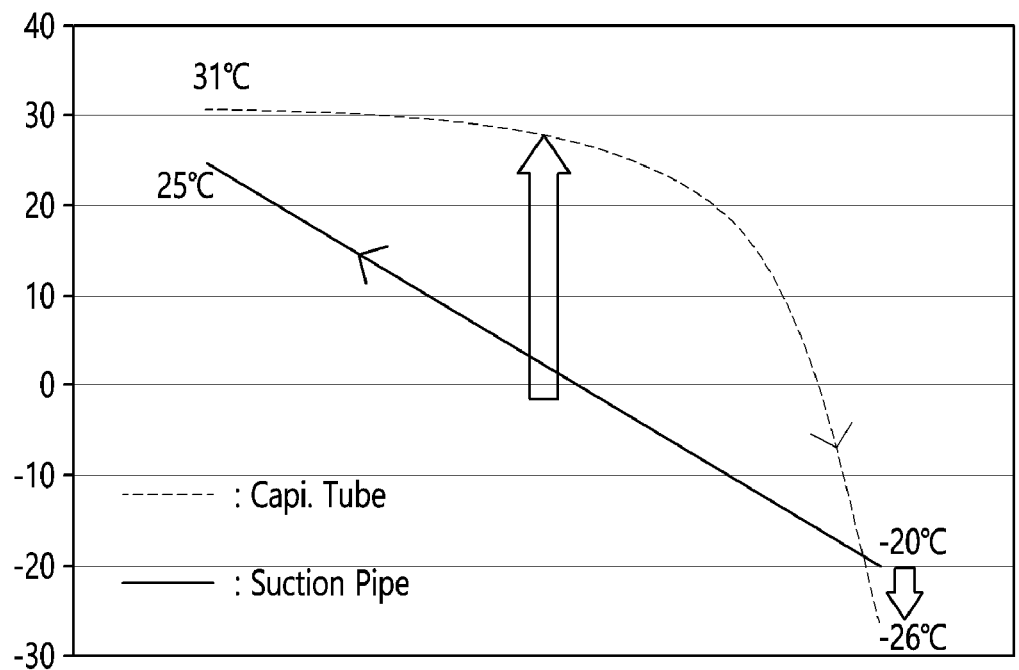

[Figure 11]
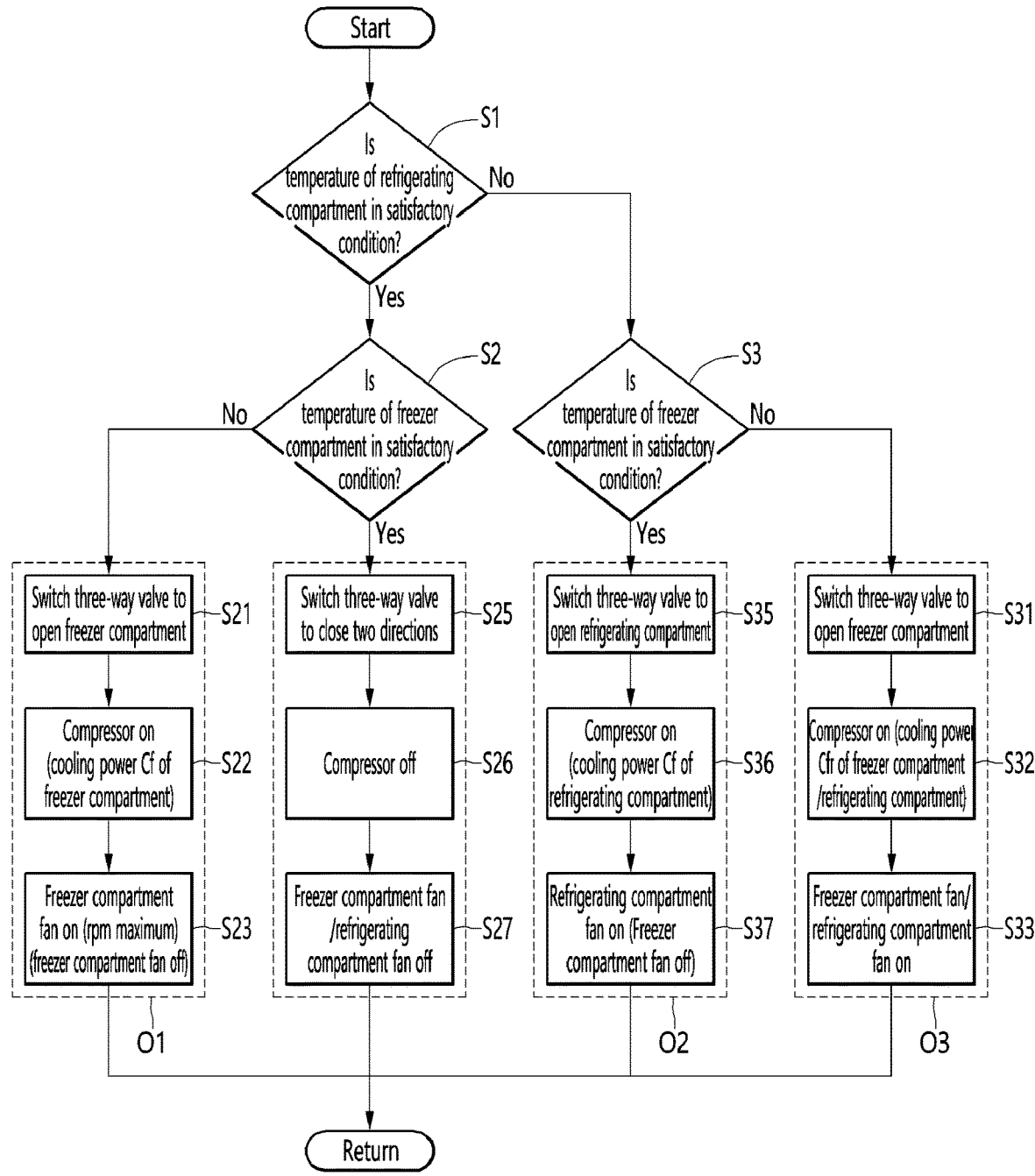

【Figure 12】
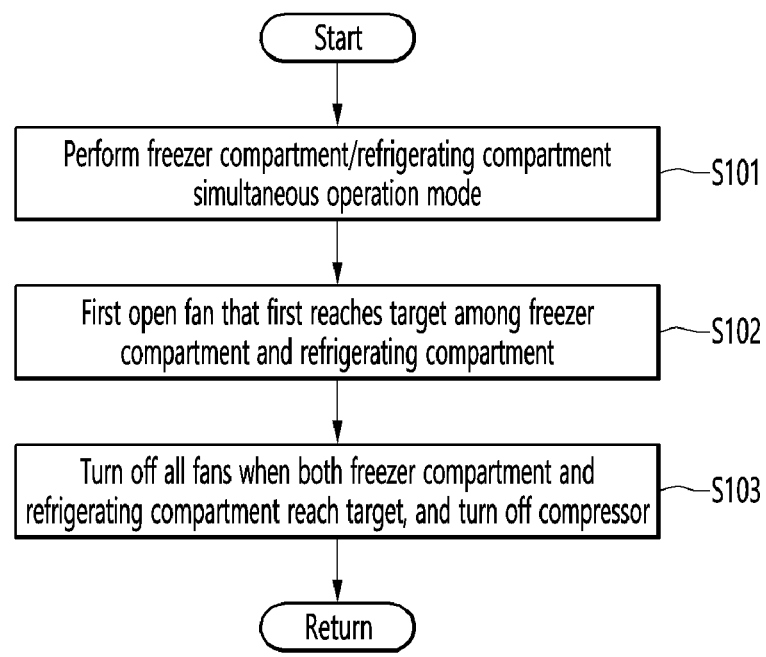

[Figure 13]
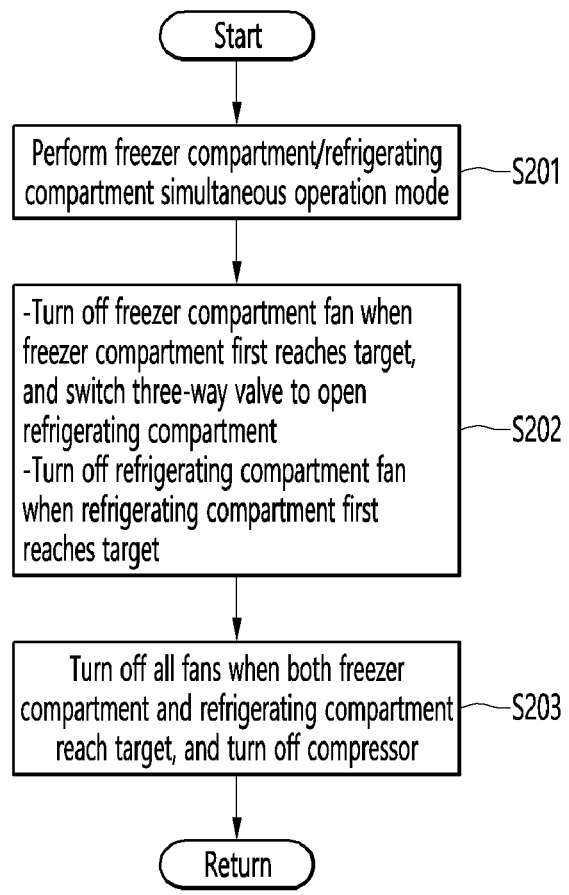

METHOD FOR CONTROLLING REFRIGERATING SYSTEM USING NON-AZEOTROPIC MIXED REFRIGERANT

This application is the National Stage filing under 35 U.S.C. 371 of International Application No. PCT/KR2020/011142, filed on Aug. 20, 2020, and claims priority to and the benefit of Korean Application No. 10-2019-0102354, filed on Aug. 21, 2019, all of which are incorporated by reference in their entirety herein.

TECHNICAL FIELD

A method for controlling a refrigerating system using a non-azeotropic mixed refrigerant is disclosed herein.

BACKGROUND ART

A refrigerating system is a system that provides cold air. In the refrigerating system, a refrigerant circulates through compression, condensation, expansion, and evaporation processes.

There are various types of refrigerants. A mixed refrigerant is a refrigerant in which two or more types of refrigerants are mixed. Mixed refrigerants include azeotropic mixed refrigerant and non-azeotropic mixed refrigerant.

The azeotropic mixed refrigerant is a refrigerant that changes phase without changing a composition of a gas phase and a liquid phase, similar to a single refrigerant. An evaporation temperature of the azeotropic mixed refrigerant is constant between an inlet and an outlet of the evaporator.

In the non-azeotropic mixed refrigerant, a refrigerant having a low boiling point evaporates first, and a refrigerant having a high boiling point evaporates later. Therefore, the non-azeotropic mixed refrigerant has different gas phase and liquid phase compositions during evaporation, and the evaporation temperature is low at the inlet of the evaporator and high at the outlet of the evaporator.

The non-azeotropic mixed refrigerant has a gliding temperature difference (GTD), which is a characteristic in which the temperature changes at equal pressure during phase change. Therefore, an evaporation operation of the non-azeotropic mixed refrigerant is divided into two evaporators. The first evaporator may be used for a freezer compartment, and the second evaporator through which the refrigerant having passed through the first evaporator is evaporated may be used for a refrigerating compartment. The freezer compartment maintains a lower temperature than the refrigerating compartment. A multi-stage evaporator may be provided to increase a performance coefficient of the refrigerating system.

Such a refrigerating system is disclosed in Korean Patent Application No. 10-2011-0115911 (hereinafter "Prior Art Document 1"), which is entitled "REFRIGERATING SYSTEM USING NON-AZEOTROPIC MIXED REFRIGERANT AND METHOD FOR CONTROLLING THE SAME" and which is hereby incorporated by reference. Prior Art Document 1 discloses a refrigerating apparatus including one compressor, two evaporators connected in series to the compressor, and a three-way valve located between the two evaporators to bypass a refrigerant introduced into a downstream refrigerating compartment evaporator.

According to Prior Art Document 1, a refrigerant that has passed through a freezer compartment evaporator located upstream is introduced into a three-way valve. In the technique of Prior Art Document 1, operation of a refrigerating compartment alone is impossible in terms of the position of the three-way valve, and cold air has to pass through the freezer compartment such that cold air is transferred to the refrigerating compartment. For this reason, control is difficult because the freezer compartment is supercooled and unnecessary cooling power is transmitted to the freezer compartment. As a result, the freezer compartment is placed in more severe control conditions, and the freezer compartment has to be controlled only with a fan of a freezer compartment evaporator.

DISCLOSURE

Technical Problem

Embodiments disclosed herein provide a method for controlling a refrigerating system using a non-azeotropic mixed refrigerant, which is capable of controlling both a freezer compartment and a refrigerating compartment in an optimal air conditioning atmosphere. Embodiments disclosed herein provide a method for controlling a refrigerating system using a non-azeotropic mixed refrigerant, which is capable of implementing various operation modes required for operation of a refrigerating apparatus. Embodiments disclosed herein provide a refrigerating system using a non-azeotropic mixed refrigerant, which is capable of controlling various and convenient operation conditions.

Technical Solution

According to embodiments disclosed herein, a method for controlling a refrigerating system using a non-azeotropic mixed refrigerant is provided, the refrigerating system including a first evaporator configured to supply cold air to a freezer compartment located upstream and a second evaporator configured to supply cold air to a refrigerating compartment located downstream, based on a flow direction of the non-azeotropic mixed refrigerant. The method may include a first operation in which a compressor is operated, a freezer compartment fan is operated to blow air to the first evaporator, and a refrigerating compartment fan is operated to blow air to the second evaporator, such that the refrigerating apparatus quickly reaches a target temperature.

The method may further include a second operation in which, when the freezer compartment reaches a target temperature or the refrigerating compartment reaches a target temperature, the compressor is continuously operated, and the freezer compartment fan or the refrigerating compartment fan corresponding to one of the freezer compartment or the refrigerating compartment that reaches the target temperature is stopped. Therefore, cooling power may be concentrated in the interior space where the target temperature has not been reached.

The method may further include a third operation in which, when both the freezer compartment and the refrigerating compartment reach the target temperatures, both the refrigerating compartment fan and the freezer compartment fan are turned off and the compressor is stopped, thereby reducing power waste.

The refrigerating system may further include a three-way valve disposed upstream of the first evaporator to switch a flow direction of the non-azeotropic mixed refrigerant to one of the first evaporator or the second evaporator, and the three-way valve may direct the non-azeotropic mixed refrigerant into the first evaporator in the first operation. Therefore, as cold air is supplied to both the first evaporator and the second evaporator connected in series, all of the interior space may quickly reach the target temperature.

When the freezer compartment reaches the target temperature first in the second operation, the three-way valve may be switched to direct the non-azeotropic mixed refrigerant into the second evaporator. Therefore, cold air may be concentrated only in the refrigerating compartment.

The compressor may have a variable compression capacity, and the compressor may be operated with a first compression capacity having a high compression capacity in the first operation. The compressor may be operated in response to a refrigeration load.

When the freezer compartment reaches the target temperature first in the second operation, the three-way valve may be switched to direct the non-azeotropic mixed refrigerant into the second evaporator. Therefore, cooling power may be concentrated in a demand space of cooling power.

The compressor may be operated with a second compression capacity lower than the first compression capacity. Therefore, cooling power may be controlled and supplied in response to a required load.

When the refrigerating compartment reaches the target temperature first in the second operation, the three-way valve may maintain a state in which the non-azeotropic mixed refrigerant flows into the first evaporator. Therefore, it is possible to concentrate cooling power in the freezer compartment.

The compressor may be operated with a third compression capacity lower than the first compression capacity and higher than the second compression capacity. Therefore, cooling power may be controlled and supplied in response to the required load.

The freezer compartment fan may be a variable-speed fan having at least a first rotational speed and a second rotational speed which is faster than the first rotational speed, and when the refrigerating compartment reaches the target temperature first in the second operation, the freezer compartment fan may be operated at the second rotational speed. Therefore, it is possible to prevent cooling power from being supplied unnecessarily to the refrigerating compartment as much as possible. In addition, it is possible to quickly supply cooling power only to the freezer compartment, such that the freezer compartment may quickly reach the target temperature.

The freezer compartment fan may be operated at a first rotational speed in the first operation. Therefore, cooling power may be supplied to the refrigerating compartment and the freezer compartment, respectively.

The three-way valve may switch a refrigerant condensed by a condenser. Therefore, the condensed refrigerant may be quickly distributed to allow the refrigerating system to operate.

The refrigerating system may further include a first connection pipe that connects the three-way valve to the first evaporator, and a second connection pipe that connects the three-way valve to the second evaporator. The condensed refrigerant may be directly introduced into the corresponding evaporator as needed.

Expanders may be disposed in the first and second connection pipes. The expanded refrigerant may be introduced into the evaporator.

According to embodiments disclosed herein, a method for controlling a refrigerating system including a compressor configured to compress a non-azeotropic mixed refrigerant, a first evaporator and a second evaporator connected in series based on a flow direction of the non-azeotropic mixed refrigerant, the first evaporator being configured to supply cold air to a freezer compartment located upstream, the second evaporator being configured to supply cold air to a refrigerating compartment located downstream, and a switch valve disposed upstream of the first evaporator to switch the flow direction of the non-azeotropic mixed refrigerant to one of the first evaporator or the second evaporator. It is possible to actively cope with loads of the freezer compartment and the refrigerating compartment.

A freezer compartment/refrigerating compartment simultaneous operation mode in which the non-azeotropic mixed refrigerant is directed into the first evaporator to supply cold air to the refrigerating compartment and the freezer compartment may be performed. Therefore, each interior space may quickly reach a target temperature.

A freezer compartment single operation mode in which the non-azeotropic mixed refrigerant is directed into the first evaporator to supply cold air to the freezer compartment alone may be performed. Therefore, cold air may be supplied only to the freezer compartment.

A refrigerating compartment single operation mode in which the non-azeotropic mixed refrigerant is directed into the second evaporator to supply cold air to the refrigerating compartment alone may be performed. Therefore, cold air may be supplied only to the refrigerating compartment.

In the above-described modes, cooling power may be more actively supplied using the non-azeotropic mixed refrigerant. When switching between modes, waste of cooling power may be reduced, and the refrigerating system may more actively cope with the target operation mode.

In the freezer compartment/refrigerating compartment simultaneous operation mode, the non-azeotropic mixed refrigerant may be evaporated in both the first evaporator and the second evaporator. Therefore, each interior space may quickly reach the target temperature.

In the freezer compartment single operation mode, the non-azeotropic mixed refrigerant may be evaporated only in the first evaporator. In this case, the freezer compartment corresponding to the first evaporator reaches the target temperature more quickly, and cooling power is not supplied to the second evaporator, thereby preventing overcooling.

The freezer compartment fan configured to blow air to the first evaporator may be a variable-speed fan having a first rotational speed and a second rotational speed faster than the first rotational speed. The freezer compartment fan may be operated at the second rotational speed in the freezer compartment single operation mode, thereby cooling the freezer compartment more quickly.

The compressor may have at least three different operation compression capacities. The compressor may be operated with a high compression capacity in the freezer compartment/refrigerating compartment simultaneous operation mode, the compressor may be operated with a medium compression capacity in the freezer compartment single operation mode, and the compressor may be operated with a low compression capacity in the refrigerating compartment single operation mode. Therefore, control may be performed so as to supply cooling power in response to operation of each mode, and it is possible to prevent unnecessary waste of power and cooling power.

According to embodiments disclosed herein, a method for controlling a refrigerating system using a non-azeotropic mixed refrigerant, the refrigerating system including a first evaporator and a second evaporator connected in series based on a flow direction of the non-azeotropic mixed refrigerant, the first evaporator being configured to supply cold air to a freezer compartment located upstream, the second evaporator being configured to supply cold air to a refrigerating compartment located downstream, and a switch valve disposed upstream of the first evaporator to switch the flow direction of the non-azeotropic mixed refrigerant to one of the first evaporator or the second evaporator. Each control is divided by determining whether temperatures of the freezer compartment and the refrigerating compartment satisfy target temperatures, and the refrigerating system may be operated more actively in response to the target temperature in the interior space.

When the freezer compartment does not reach the target temperature, the switch valve may be controlled such that the non-azeotropic mixed refrigerant flows into the first evaporator, and when only the refrigerating compartment among the freezer compartment and the refrigerating compartment does not reach the target temperature, the switch valve may be controlled such that the non-azeotropic mixed refrigerant flows into the second evaporator. Therefore, refrigerant may be supplied to the required target place.

When the freezer compartment and the refrigerating compartment reach the target temperatures, a compressor may be stopped and the switch valve closed. Therefore, it is possible to quickly reach the temperature of the interior space and it is possible to prevent waste of power and cooling power.

When only the refrigerating compartment among the freezer compartment and the refrigerating compartment reaches the target temperature, control may be performed such that the non-azeotropic mixed refrigerant is all evaporated by the first evaporator. The cooling power may be concentrated in the target place. In addition, the compressor may be controlled to operate at a medium speed, thereby preventing unnecessary waste of cooling power and power.

The freezer compartment fan configured to blow air to the first evaporator may be a variable-speed fan having a first rotational speed and a second rotational speed faster than the first rotational speed, and when only the freezer compartment among the freezer compartment and the refrigerating compartment does not reach the target temperature, the freezer compartment fan may operate at the second rotational speed. In this case, cooling power may be quickly supplied to the required place, and overcooling of the space where cooling power is unnecessary may be prevented.

When only the refrigerating compartment among the freezer compartment and the refrigerating compartment does not reach the target temperature, the compressor may operate at a low speed. Optimal cooling power may be provided to the refrigerating system.

Advantageous Effects

According to embodiments disclosed herein, simultaneous operation of a freezer compartment and a refrigerating compartment and single operation of the refrigerating compartment are possible, such that various operation modes required for a refrigerating apparatus may be satisfied. Further, according to embodiments disclosed herein, various operation modes required for operation of the refrigerating apparatus may be satisfied by actively utilizing characteristics of the non-azeotropic mixed refrigerant. Furthermore, according to embodiments disclosed herein, it is possible to control an interior space in various ways, thereby increasing control stability of the refrigerating system.

DESCRIPTION OF DRAWINGS

FIG. 1 is a schematic temperature graph of a non-azeotropic mixed refrigerant and air in a counterflow evaporator;

FIG. 2 is a graph showing a temperature difference between an inlet and an outlet of an evaporator and a gliding temperature difference of a non-azeotropic mixed refrigerant according to compositions of isobutane and propane;

FIG. 3A is a graph showing a refrigeration cycle when isobutane is used as the refrigerant;

FIG. 3B is a graph showing a refrigeration cycle when a non-azeotropic mixed refrigerant is used as the refrigerant; and FIG. 4 is a view showing a refrigerating apparatus according to an embodiment;

FIG. 5 is a schematic view of a refrigerating system applicable to a refrigerating apparatus according to an embodiment;

FIG. 6 is a schematic view of an evaporator and capillary tubes;

FIG. 7 is a schematic showing temperature change in a refrigerant pipe and compressor suction pipe in a regenerative heat exchanger;

FIG. 8 is a partial view of the refrigerating system, in which a regenerative heat exchanger is exaggerated;

FIG. 9 is a schematic view of an evaporator and capillary tubes in a parallel 1-compression 2-evaporation system; and FIGS. 10A-10B are temperature graphs explaining heat exchange reversal region in a parallel 1-compression 2-evaporation system;

FIG. 11 is a flowchart of a control method according to an embodiment;

FIG. 12 is a flowchart of a method for controlling a refrigerating system using a non-azeotropic mixed refrigerant according to another embodiment; and FIG. 13 is a flowchart of a method for controlling a refrigerating system using a non-azeotropic mixed refrigerant according to another embodiment.

BEST MODE

Hereinafter, embodiments will be described with reference to the accompanying drawings. The embodiments are not limited to the embodiments discussed hereinafter, and those skilled in the art who understand the spirit will be able to easily propose other embodiments falling within the scope by adding, modifying, and deleting components. However, this also falls within the spirit.

First, a non-azeotropic mixed refrigerant that is preferably applicable is presented. In the description related to the selection of the non-azeotropic mixed refrigerant, contents of the present disclosure are divided into technical elements and described in detail. First, a process of selecting a type of a non-azeotropic mixed refrigerant will be described.

Selection of Type of Non-Azeotropic Mixed Refrigerant

Refrigerants to be mixed, which are suitable for the non-azeotropic mixed refrigerant, are proposed. As the refrigerant to be mixed, a hydrocarbon-based (HC-based) refrigerant may be selected. Hydrocarbon-based refrigerant is an eco-friendly refrigerant having a low ozone depletion potential (ODP) and a low global warming potential (GWP). The criteria for selecting a refrigerant suitable for the non-azeotropic mixed refrigerant among hydrocarbon-based refrigerants may be summarized as follows.

First, from a viewpoint of compression work, when a difference (pressure difference ($\Delta P$)) between a condensing pressure (Pd or p1) and an evaporation pressure (Ps or p2) is smaller, compression work of the compressor is further reduced, which is advantageous for efficiency. Therefore, refrigerants having a low condensing pressure and a high evaporation pressure may be selected. However, considering reliability of compressors, an evaporation pressure of 50 kPa or more may be selected.

Second, from a viewpoint of utilization of production facilities, refrigerants may be selected which have been used in the past for compatibility of existing facilities and components. Third, from a viewpoint of purchase cost of refrigerants, refrigerants obtainable at low cost may be selected. Fourth, from a viewpoint of safety, refrigerants that are not harmful to humans when refrigerant leaks may be selected.

Fifth, from a viewpoint of reducing irreversible loss, reduction of a temperature difference between a refrigerant and cold air so as to increase efficiency of a cycle is desirable. Sixth, from a viewpoint of handling, refrigerants that can be conveniently handled at a time of work and may be conveniently injected by handlers may be selected.

The above criteria for selecting refrigerants is variously applied in selecting the non-azeotropic mixed refrigerant.

Classification and Selection of Hydrocarbons

Based on evaporation temperature (Tv), candidate refrigerants suggested by the National Institute of Standards and Technology are classified into three (upper, middle, and lower) groups in descending order of evaporation temperature. A density of refrigerant is higher as evaporation temperature increases.

A combination of candidate refrigerants capable of exhibiting an evaporation temperature of −20° C. to −30° C. suitable for the environment of refrigerating apparatuses may be selected. Hereinafter, classification of the candidate refrigerants will be described.

The candidate refrigerants are classified into three types based on boundary values of evaporation temperature, that is, −12° C. and −50° C. The candidate refrigerants classified into the three types are shown in Table 1. It can be seen that the classification of the evaporation temperature changes greatly based on the boundary values.

TABLE 1

| No. | group | Hydrocarbon name | Evaporation temperature (1 bar) ° C. | Evaporation temperature (20 bar) ° C. | Triple point temperature ° C. |
|---|---|---|---|---|---|
| 1 | upper | isopentane | 27.5 | 154.7 | −159.85 |
| 2 | | 1,2-butadiene | 10.3 | 124.8 | −136.25 |
| 3 | | n-butane | −0.9 | 114.5 | −138.25 |
| 4 | | butene | −6.6 | 105.8 | −185.35 |
| 5 | | isobutane | −12 | 100.7 | −159.65 |
| 6 | middle | propadiene | −34.7 | 68.2 | −136.25 |
| 7 | | propane | −42.4 | 57.3 | −187.71 |
| 8 | | propylene | −47.9 | 48.6 | −185.26 |
| 9 | lower | ethane | −88.8 | −7.2 | −182.80 |
| 10 | | ethylene | −104 | −29.1 | −169.15 |

Referring to Table 1, refrigerants that may be mixed as the non-azeotropic mixed refrigerant may be selected and combined in each region. First, which group is selected among the three groups will be described. There may be one case in which refrigerants are selected from the three groups and three refrigerants are mixed, and three cases in which refrigerants are selected from two groups and two refrigerants are mixed.

When at least one refrigerant is selected from each of the three groups and three or more refrigerants are mixed, the temperature rise and drop in the non-azeotropic mixed refrigerant may be excessively great. In this case, design of the refrigerating system may be difficult.

Thus, the non-azeotropic mixed refrigerant may be obtained by selecting at least one refrigerant from each of two groups. At least one refrigerant may be selected from each of the middle group and the lower group, from each of the upper group and the middle group, and from each of the upper group and the lower group. Among them, a composition in which at least one refrigerant selected from each of the upper group and the middle group is mixed may be provided as the non-azeotropic mixed refrigerant.

When at least one refrigerant selected from each of the middle group and the lower group is mixed, the evaporation temperature of the refrigerant is excessively low. Thus, a difference between interior temperature and the evaporation temperature of the refrigerant is excessively great in a general refrigerating apparatus. Therefore, efficiency of the refrigeration cycle deteriorates and power consumption increases.

When at least one refrigerant selected from each of the upper group and the lower group is mixed, a difference in evaporation temperature between the at least two refrigerants is excessively great. Therefore, unless a special high-pressure environment is created, each refrigerant is classified into a liquid refrigerant and a gaseous refrigerant under actual use conditions. For this reason, it is difficult to inject the at least two refrigerants together into a refrigerant pipe.

Selection of Hydrocarbons in Groups of Hydrocarbons

Which refrigerant is selected from the upper group and the middle group will be described hereinafter.

First, the refrigerant selected from the upper group will be described. At least one refrigerant selected from the upper group may be used as the non-azeotropic mixed refrigerant.

As isopentane and butadiene have a relatively high evaporation temperature, the inner temperature of the evaporator of the refrigerating apparatus is limited and freezing efficiency deteriorates. Isobutane and N-butane may be used without changing components of the refrigeration cycle, such as the compressor of the refrigerating apparatus, currently used. Therefore, their use is most expected among the refrigerants included in the upper group.

N-butane has a smaller compression work than isobutane, but has a low evaporation pressure (Ps), which may cause a problem in the reliability of the compressor. For this reason, isobutane may be selected from the upper group. As described above, selection of at least one from the other hydrocarbons included in the upper group is permissible.

The refrigerant selected from the middle group will be described hereinafter. At least one refrigerant selected from the middle group may be used in the non-azeotropic mixed refrigerant.

As propadiene has a smaller pressure difference (ΔP) than that of propane, efficiency is high. However, propadiene is expensive and harmful to respiratory systems and skin when humans inhale due to leakage. Propylene has a greater pressure difference than that of propane, and thus, compression work of the compressor is increased.

For this reason, propane may be selected from the middle group. As described above, selection of at least one from the other hydrocarbons included in the middle group is permissible.

For reference, isobutane may also be referred to as R600a, and propane may also be referred to as R290. Although isobutane and propane may be selected, other hydrocarbons belonging to the same group may be applied in obtaining properties of the non-azeotropic mixed refrigerant, even where there is no specific mention in the following description. For example, if it is possible to obtain a similar gliding temperature difference of the non-azeotropic mixed refrigerant, other compositions than isobutane and propane may be used.

Selection of Ratio of Selected Hydrocarbon Refrigerant, Considering Power Consumption of Compression Work As the refrigerant to be mixed in the non-azeotropic mixed refrigerant, isobutane is selected from the upper group and propane is selected from the middle group. Ratios of the refrigerants to be mixed in the non-azeotropic mixed refrigerant may be selected as follows.

Power consumption of the compressor, which is a main energy consumption source of the refrigerating system, depends on the pressure difference. In other words, as the pressure difference is increases, more compression work needs to be consumed. As the compression work increases, efficiency of the cycle further deteriorates.

Isobutane has a smaller pressure difference ($\Delta P$) than that of propane. For this reason, the non-azeotropic mixed refrigerant may be provided with a weight ratio of isobutane of 50% or more and a weight ratio of propane of 50% or less.

In the case of a composition in which the non-azeotropic mixed refrigerant includes isobutane and propane mixed at a ratio of 5:5, the condensing pressure is 745.3 kPa, the evaporation pressure is 120.5 kPa, and the pressure difference is 624.7 kPa. In the case of a composition in which the non-azeotropic mixed refrigerant is substantially isobutane with a very small amount of propane, the condensing pressure is 393.4 kPa, the evaporation pressure is 53.5 kPa, and the pressure difference is 340.0 Pa.

The pressure is obtained by measuring an average value when the compressor is turned on under ISO power consumption measurement conditions. All values related to the composition of the non-azeotropic mixed refrigerant are obtained under the same conditions.

Ranges of the condensing pressure, the evaporation pressure, and the pressure difference of the non-azeotropic mixed refrigerant may be known using a mixing ratio of isobutane to propane that can reduce the compression work as described above.

Selection of Ratio of Selected Hydrocarbon Refrigerant, Considering Irreversible Loss of Evaporator As described above, the non-azeotropic mixed refrigerant has a gliding temperature difference (GTD) upon phase change. Using the gliding temperature difference, evaporators may be sequentially installed in a freezer compartment and a refrigerating compartment to provide an appropriate temperature atmosphere for each partitioned space. According to the gliding temperature difference, a temperature difference between air and refrigerant evaporated in each evaporator may be reduced, thereby reducing irreversibility occurring during heat exchange. Reduction in irreversible loss may reduce the loss of the refrigerating system.

FIG. 1 is a schematic temperature graph of a non-azeotropic mixed refrigerant and air in a counterflow evaporator. In FIG. 1, the horizontal axis represents progress distance, and the air and the non-azeotropic mixed refrigerant move in opposite directions as indicated by arrows. In FIG. 1, the vertical axis represents temperature. Referring to FIG. 1, 1 is a line for air, 2 is a line for the non-azeotropic mixed refrigerant, 3 is a line for temperature rise of the non-azeotropic mixed refrigerant, 4 is a line for temperature drop of the non-azeotropic mixed refrigerant, and 5 is a line for a single refrigerant.

Referring to the line 1 for air, for example, the temperature of the air may drop from a range of −20° C. to −18° C. and the air may pass through the evaporator. Referring to the line 2 for the non-azeotropic mixed refrigerant, the temperature of the non-azeotropic mixed refrigerant may rise from −27° C. and the non-azeotropic mixed refrigerant may pass through the evaporator. The gliding temperature difference of the non-azeotropic mixed refrigerant may change according to the ratio of isobutane to propane. When the gliding temperature difference is increased, the line 2 for the non-azeotropic mixed refrigerant may move toward the line 3 for the temperature rise of the non-azeotropic mixed refrigerant. When the gliding temperature difference is decreased, the line 2 for the non-azeotropic mixed refrigerant may move toward the line 4 for the temperature drop of the non-azeotropic mixed refrigerant. For reference, as there is no phase change in the single refrigerant, there is no temperature change in the line 5 for the single refrigerant.

Irreversible loss when heat exchange occurs cannot be avoided due to the temperature difference between two interfaces where heat exchange occurs. For example, when there is no temperature difference between interfaces of two objects that exchange heat with each other, there is no irreversible loss, but heat exchange does not occur.

However, there are various methods for reducing irreversible loss due to heat exchange. A representative method is to configure a heat exchanger with counterflow. A counterflow heat exchanger may reduce irreversible loss by allowing the temperature difference between moving fluids to be reduced as much as possible.

In the case of an evaporator to which the non-azeotropic mixed refrigerant is applied, the heat exchanger may be configured with counterflow as shown in FIG. 1. As the temperature of the non-azeotropic mixed refrigerant is increased during evaporation due to the gliding temperature difference, the temperature difference between the air and the non-azeotropic mixed refrigerant may be reduced. When the gliding temperature difference of the non-azeotropic mixed refrigerant and the temperature difference of the air are reduced, irreversible loss may be reduced and efficiency of the refrigeration cycle may be increased.

The gliding temperature difference of the non-azeotropic mixed refrigerant may not be increased infinitely due to limitations of the refrigerant. In addition, when the gliding temperature difference of the non-azeotropic mixed refrigerant is changed, the gliding temperature difference of the cold air is changed. Accordingly, a size of the evaporator is changed and total efficiency of the refrigeration cycle is affected. For example, when the gliding temperature difference is increased, the inlet temperature of the refrigerant is decreased or the outlet temperature of the refrigerant is overheated, thus reducing efficiency of the refrigeration cycle.

On the other hand, the gliding temperature difference of the non-azeotropic mixed refrigerant and the temperature difference of the air may converge to zero if a size of the heat exchanger is infinitely large. However, considering mass productivity and cost reduction of the heat exchanger, in the case of a general refrigerating apparatus, the gliding temperature difference of the non-azeotropic mixed refrigerant and the temperature difference of the air are about 3° C. to 4° C.

FIG. 2 is a graph showing a temperature difference between an inlet and an outlet of an evaporator and a gliding temperature difference of a non-azeotropic mixed refrigerant according to compositions of isobutane and propane. The horizontal axis represents a content of isobutane, and the vertical axis represents a temperature difference.

Referring to FIG. 2, when isobutane and propane are each included in 100%, there is no temperature change while isobutane and propane undergo evaporation as a single refrigerant. When isobutane and propane are mixed, there are the gliding temperature difference of the non-azeotropic mixed refrigerant and the temperature difference between the inlet and the outlet of the evaporator. A temperature difference 11 between the inlet and the outlet of the evaporator is smaller than a gliding temperature difference 12 of the non-azeotropic mixed refrigerant. This may be caused by incomplete heat transfer between the refrigerant and air.

When the gliding temperature difference of the non-azeotropic mixed refrigerant is greater than the temperature difference between the inlet and the outlet of the evaporator, characteristics of the non-azeotropic mixed refrigerant may be well utilized. Also, it is advantageous from a viewpoint of reducing irreversibility in heat exchange and increasing efficiency of the refrigeration cycle. Likewise, the gliding temperature difference of the non-azeotropic mixed refrigerant may be greater than the temperature difference of the air passing through the evaporator.

In a general refrigerating apparatus, the temperature difference of the air passing through the inlet and the outlet of the evaporator may reach 4° C. to 10° C. In most cases, the temperature difference of air is close to 4° C. For this reason, the gliding temperature difference of the non-azeotropic mixed refrigerant may be maintained higher than 4° C. Maintaining the gliding temperature difference to be at least 4.1° C. or higher, which is minimally higher than the temperature difference between the inlet and the outlet of evaporator, may be advantageous. When the gliding temperature difference of the non-azeotropic mixed refrigerant is less than 4.1° C., thermal efficiency of the refrigeration cycle may decrease.

In contrast, when the gliding temperature difference of the non-azeotropic mixed refrigerant is greater than 4.1° C., the temperature difference between the air and the refrigerant at the outlet side of the refrigerant decreases, irreversibility decreases, and thermal efficiency of the refrigeration cycle increases. That the temperature difference between the air and the refrigerant at the outlet side of the refrigerant decreases means that the line 2 for the non-azeotropic mixed refrigerant moves toward the line 3 for the temperature rise of the non-azeotropic mixed refrigerant in FIG. 1.

In FIG. 2, when the gliding temperature difference of the non-azeotropic mixed refrigerant is 4.1° C., isobutane is 90%, and when the gliding temperature difference of the non-azeotropic mixed refrigerant is greater than 4.1° C., isobutane is less than 90%. In order to minimize compression work of compressor, isobutane may be 50% or more.

As a result, a weight ratio of the non-azeotropic mixed refrigerant provided as isobutane and propane may be expressed as in Equation 1.

$$50\% \leq \text{isobutane} \leq 90\% \quad \text{[Math FIG. 1]}$$

Propane is the remaining or other component in the weight ratio of the non-azeotropic mixed refrigerant.

As the gliding temperature difference of the non-azeotropic mixed refrigerant increases, irreversible loss may be reduced. However, when the gliding temperature difference is excessively great, a size of the evaporator becomes excessively large in order to secure a sufficient heat exchange passage between the refrigerant and the air. A space inside of the refrigerating apparatus may be secured when the evaporator applied to a general household refrigerating apparatus is designed with a capacity of 200 W or less. For this reason, the gliding temperature difference of the non-azeotropic mixed refrigerant may be limited to 7.2° C. or less.

In addition, when the gliding temperature difference of the non-azeotropic mixed refrigerant is excessively great, the temperature of the inlet of the evaporator may be too low or the outlet of the evaporator outlet may be overheated too quickly, based on the non-azeotropic mixed refrigerant. An available area of the evaporator may be reduced and efficiency of the heat exchange may decrease.

At the outlet of the evaporator, the temperature of the non-azeotropic mixed refrigerant has to be higher than the temperature of the air introduced into the evaporator. Otherwise, efficiency of the heat exchanger decreases due to reversal of the temperatures of the refrigerant and air. When this condition is not satisfied, efficiency of the refrigerating system may be reduced.

In FIG. 2, when the gliding temperature difference of the non-azeotropic mixed refrigerant is 7.2° C., isobutane is 75%, and when the gliding temperature difference of the non-azeotropic mixed refrigerant is less than 7.2° C., isobutane is more than 75%. As a result, considering this condition and the condition of Equation 1 together, a weight ratio of the non-azeotropic mixed refrigerant provided as isobutane and propane may be expressed as in Equation 2.

$$75\% \leq \text{isobutane} \leq 90\% \quad \text{[Math FIG. 2]}$$

Propane is the remaining or other component in the weight ratio of the non-azeotropic mixed refrigerant.

Selection of Ratio of Selected Hydrocarbon Refrigerant, Considering Compatibility of Production Facilities and Components The temperature difference between the inlet and the outlet of the evaporator of a general refrigerating apparatus may be set to 3° C. to 5° C. This is due to various factors, such components of the refrigerating apparatus, internal volume of the machine room, heat capacity of each component, and size of the fan, for example. When a composition ratio of the non-azeotropic mixed refrigerant capable of providing the temperature of the inlet and the outlet of the evaporator, that is, 3° C. to 5° C., is found in FIG. 2, it can be seen that isobutane is between 76% and 87%.

As a result of the above discussion, the non-azeotropic mixed refrigerant that satisfies all of the above-described conditions may be expressed as Equation 3.

$$76\% \leq \text{isobutane} \leq 87\% \quad \text{[Math FIG. 3]}$$

Propane is the remaining or other component in the weight ratio of the non-azeotropic mixed refrigerant.

Ratio of Hydrocarbon Refrigerant to be Finally Applied

The isobutane application range that can be selected on the basis of the various criteria described above may be determined to be 81% to 82%, which is the middle range of Equation 3. Propane may occupy the remaining portion of the non-azeotropic mixed refrigerant.

The case of using only isobutane was compared with the case of using the non-azeotropic mixed refrigerant in which 85% of isobutane and 15% of propane were applied. In both cases, the evaporators were constructed in parallel to form the cycle of the refrigerating system.

The experimental conditions were −29° C. and −15° C. and the inlet temperatures of the compressors were 25° C., respectively. Due to the difference in the refrigerant, the temperature of the condenser was 31° C. when using only isobutane and 29° C. when using the non-azeotropic mixed refrigerant.

FIGS. 3A and 3B are tables for comparison of the refrigeration cycle in each case. FIG. 3A is a graph showing the refrigeration cycle when only isobutane is used. FIG. 3B is a graph showing the refrigeration cycle when the non-azeotropic mixed refrigerant is used.

In the experiment according to FIGS. 3A-3B, it can be seen that when the non-azeotropic mixed refrigerant is used, improvement in coefficient of performance was approximately 4.5%.

FIG. 4 is a schematic view of a refrigerating system according to an embodiment. Referring to FIG. 4, a refrigerating apparatus according to an embodiment may include a machine room 31, a freezer compartment 32, and a refrigerating compartment 33. The refrigerating apparatus forms a refrigeration cycle that uses the non-azeotropic mixed refrigerant. In the refrigeration cycle, a compressor 21 that compresses the refrigerant, an expander 22 that expands the compressed refrigerant, a condenser 23 that condenses the expanded refrigerant, and first and second evaporators 24 and 25 that evaporates the condensed refrigerant may be included.

The compressor 21, the expander 22, and the condenser 23 may be provided in the machine room 31. The first evaporator 24 may be provided in the freezer compartment 32. The second evaporator 25 may be provided in the refrigerating compartment 33. The freezer compartment and the refrigerating compartment may be referred to as an "interior space".

A freezer compartment fan 24a corresponding to the first evaporator 24 and a refrigerating compartment fan 25a corresponding to the second evaporator 25 may be further provided. The fans 24a, 25a may supply cold air of the evaporators to each interior space.

A temperature of the non-azeotropic mixed refrigerant may be lower in the first evaporator 24 than in the second evaporator 25. As the first evaporator 24 is placed in the freezer compartment 32, the refrigerating system may be operated more appropriately in a partitioned space of the refrigerating apparatus. Therefore, irreversible loss may be further reduced in the evaporation operation of the evaporator.

FIG. 5 is a schematic view of a refrigerating system applicable to a refrigerating apparatus according to an embodiment. Referring to FIG. 5, the refrigerating system according to this embodiment may include a compressor 110 that compresses a refrigerant, a condenser 120 that condenses the compressed refrigerant, and evaporators 150 and 160 that evaporate the refrigerant condensed by the condenser 120. The refrigerant evaporated by the evaporators 150 and 160 may circulate to the compressor 110.

The evaporators 150 and 160 may include first evaporator 150 capable of supplying cold air to a freezer compartment and second evaporator 160 capable of supplying cold air to a refrigerating compartment. A three-way valve 130 capable of branching and supplying the condensed refrigerant to the evaporators 150 and 160 may be further provided. The three-way valve 130 may selectively supply the refrigerant supplied from the condenser 120 to the first evaporator 150 or the second evaporator 160. The three-way valve 130 may be a multi-directional valve that branches introduced refrigerant to at least two places. As the three-way valve 130 branches the refrigerant in multiple directions, the three-way valve 130 may also be referred to as a "multi-directional valve".

The refrigerant heat-exchanged in the first evaporator 150 may be supplied to the second evaporator 160. The refrigerant may be a non-azeotropic mixed refrigerant and a temperature of the refrigerant may rise during evaporation. The first evaporator 150 may evaporate the refrigerant at a lower temperature than the second evaporator 160. Therefore, the first evaporator 150 may be more suitable for supplying cold air to the freezer compartment, and the second evaporator 160 may be more suitable for supplying cold air to the refrigerating compartment.

The first evaporator 150 and the second evaporator 160 may be connected in series based on a refrigerant flow. These advantages are remarkable as compared to a case of using a single refrigerant or an azeotropic mixed refrigerant.

Advantages of the non-azeotropic mixed refrigerant when two evaporators are used in a single compressor will be described hereinafter.

First, a refrigerating system using two evaporators in a single compressor (hereinafter, simply referred to as a "1-compression 2-evaporation system") may use a single refrigerant or an azeotropic mixed refrigerant, a temperature of which does not change during evaporation. The evaporators may include a refrigerating compartment evaporator that supplies cold air to the refrigerating compartment and a freezer compartment evaporator that supplies cold air to the freezer compartment.

In this case, when the two evaporators are connected in parallel, the refrigerant concentrates in the freezer compartment evaporator increasing irreversible loss and control is difficult. In contrast, when the two evaporators are connected in series, a thermal insulation load in the freezer compartment is large, and thus, refrigerant has to be supplied to the freezer compartment evaporator after passing through the refrigerating compartment evaporator. This is because the refrigerant has to remain in the freezer compartment evaporator for a long time in order to cope with the thermal insulation load of the freezer compartment.

The three-way valve may be installed upstream of the refrigerating compartment evaporator. According to the three-way valve, the refrigerant may be supplied to the freezer compartment evaporator without passing through the refrigerating compartment evaporator. In this manner, over-cooling of the refrigerating compartment corresponding to the refrigerating compartment evaporator may be prevented. This may be referred to as a "serial bypass 1-compression 2-evaporation system".

The serial bypass 1-compression 2-evaporation system is difficult to accurately control because a flow rate control of refrigerant corresponding to the interior space and intermittent control of the three-way valve corresponding to change in thermal insulation loads of the refrigerating compartment and freezer compartment are continuously required. In addition, as refrigerant of different states passing through different passages are continuously mixed, irreversible loss increases and power consumption increases.

As a solution to this problem, a non-azeotropic mixed refrigerant may be used in a 1-compression 2-evaporation system. The temperature of the non-azeotropic mixed refrigerant rises during evaporation. Using this property, the refrigerant may be supplied to the refrigerating compartment evaporator after passing through the freezer compartment evaporator. In this case, while the non-azeotropic mixed refrigerant is evaporated, cold air may be supplied to the freezer compartment at a first temperature corresponding to a temperature of the freezer compartment, and cold air may be supplied to the refrigerating compartment at a second temperature corresponding to a temperature of the refrigerating compartment. The second temperature may be higher than the first temperature.

The gliding temperature difference of the non-azeotropic mixed refrigerant may be used such that the refrigerant flows into two evaporators in series. Therefore, irreversible loss caused by the mixing of refrigerants having different properties may be reduced. Therefore, power consumption may be reduced.

The refrigerating system according to this embodiment may be referred to as a "serial bypass 1-compression 2-evaporation" system in which the three-way valve 130 is located upstream of the first evaporator 150 and the second evaporator 160. Due to the three-way valve 130, the refrigerant may be supplied to both of the evaporators 150 and 160, or the refrigerant may bypass the first evaporator 150 and may be supplied to only the second evaporator 160. In other words, operation of the refrigerating compartment (flow B in FIG. 5) alone, and simultaneous operation of the refrigerating compartment and the freezer compartment (flow A in FIG. 5) are possible.

The operation of the freezer compartment alone reduces a frequency of the compressor with respect to simultaneous operation of the refrigerating compartment and the freezer compartment, thus lowering freezer capacity. Therefore, operation of the freezer compartment alone may be performed by evaporating all of the refrigerant in the first evaporator 150 corresponding to the freezer compartment. A fan of the refrigerating compartment may be turned off by another method or a combined method.

In all modes of operation of the refrigerating compartment alone, simultaneous operation of the refrigerating compartment and the freezer compartment, and operation of the freezer compartment alone, the temperature of the non-azeotropic mixed refrigerant increases in the second evaporator 160 corresponding to the refrigerating compartment, and thus, fear of overcooling in the refrigerating compartment may be reduced. When the single refrigerant or the azeotropic mixed refrigerant is used, the temperature is the same in the evaporation process. Therefore, supercooling in the second evaporator 160 may be avoided.

Implementation of each mode through the control of the three-way valve 130 will be described with reference to FIGS. 10 to 12.

A first capillary tube 140 may be provided in a connection passage of the first evaporator 150 among discharge sides of the three-way valve 130. A second capillary tube 145 may be provided in a connection passage of the second evaporator 160 among discharge sides of the three-way valve 130. Each of the capillary tubes 140 and 145 may be referred to as an "expander".

The first capillary tube 140 may expand the non-azeotropic mixed refrigerant to supply the refrigerant to the first evaporator 150. The second capillary tube 145 may expand the non-azeotropic mixed refrigerant to supply the refrigerant to the second evaporator 160.

A refrigerant outlet side of the first evaporator 150 may be connected to a refrigerant inlet side of the second evaporator 160. The refrigerant outlet side of the first evaporator 150 may be connected to a refrigerant outlet side of the second capillary tube 145.

A check valve 155 may be provided in a connection pipe between the first evaporator 150 and the second evaporator 160, that is, immediately downstream of the first evaporator 150. The check valve 155 may allow refrigerant flow from the first evaporator 150 to the second evaporator 160 and may not allow reverse flow in an opposite direction. Therefore, reverse flow of the refrigerant may be prevented when switching from simultaneous operation of the freezer compartment and the refrigerating compartment to operation of the refrigerating compartment alone.

A gas-liquid separator may not be suitable to be installed in the connection pipe between the first evaporator 150 and the second evaporator 160. This is because if only gas is passed in the non-azeotropic mixed refrigerant that has only partially evaporated in the first evaporator 150, sufficient cooling power may not be supplied to the second evaporator 160. In other words, the non-azeotropic mixed refrigerant may not maintain the mixing ratio of the two refrigerants in the liquid phase and the gas phase.

The gas-liquid separator 165 may be provided at the outlet side of the second evaporator 160. The gas-liquid separator 165 allows only the gas refrigerant to be discharged to the compressor 110, thereby preventing damage and noise of the compressor 110 and improving efficiency.

A compressor suction pipe 170, which connects the second evaporator 160 to the compressor 110, and the capillary tubes 140 and 145 may exchange heat with each other. Therefore, heat of the capillary tubes 140 and 145 may be transferred to the compressor suction pipe 170, such that refrigerant introduced into the compressor 110 may maintain a gas state. The cold air of the compressor suction pipe 170 may be transferred to the capillary tubes 140 and 145 to prevent cold air loss and reduce power consumption.

The compressor suction pipe 170 may exchange heat with at least one of the capillary tubes 140 and 145. In the simultaneous operation of the freezer compartment and the refrigerating compartment and the operation of the freezer compartment alone, the compressor suction pipe 170 and the first capillary tube 140 may exchange heat with each other. In the operation of the refrigerating compartment alone, the compressor suction pipe 170 and the second capillary tube 145 may exchange heat with each other. Therefore, cold air loss may be reduced in each mode and efficiency of the refrigeration cycle may be increased.

The compressor suction pipe 170 may exchange heat with both of the capillary tubes 140 and 145. Therefore, cold air loss may be reduced in all operation modes. The compressor suction pipe 170, the first capillary tube 140, and the second capillary tube 145 may be provided at positions adjacent to each other to exchange heat with each other.

The serial bypass 1-compression 2-evaporation system has at least the following advantages. First, the gliding temperature difference of the non-azeotropic mixed refrigerant is provided in the order of the freezer compartment and the refrigerating compartment, thereby reducing irreversible loss and reducing power consumption. Second, operation of the refrigerating compartment alone, operation of the freezer compartment alone, and simultaneous operation of the freezer compartment and the refrigerating compartment may all be stably performed.

As the refrigerant of embodiments, the non-azeotropic mixed refrigerant, the temperature of which rises during evaporation, is used. Therefore, a temperature at outlet sides of the capillary tubes 140 and 145 may be higher than a temperature at an outlet side of the second evaporator 160. Due to this, a heat exchange reversal phenomenon may occur. The heat exchange reversal phenomenon will be described hereinafter.

FIG. 6 is a schematic view of the evaporator and the capillary tubes, showing temperature of each point. Temperature reversal of the regenerative heat exchanger in the case of using the non-azeotropic mixed refrigerant will be described with reference to FIG. 6.

FIG. 6 shows the first evaporator 150, the second evaporator 160, and the regenerative heat exchanger 180 in which heat exchange between the compressor suction pipe 170 and the capillary tubes 140 and 145 is performed. FIG. 6 shows simultaneous operation of the freezer compartment and the refrigerating compartment.

Each point on the drawing is marked with a P, the first number 1 after the P represents the inlet side of the first capillary tube, and the first number 2 after the P represents the inlet side of the compressor suction line. The second number after the P represents an order of progress.

The refrigerant introduced through the inlet of the first capillary tube 140 flows through passages of points P11, P12, P13, and P14. The refrigerant introduced through the inlet of the compressor suction pipe 170 flows through passages of points P21 and P22. The regenerative heat exchanger 180 may correspond to a zone indicated by an arrow.

A temperature of the refrigerant flowing through the first capillary tube 140 in the region of the regenerative heat exchanger 180 drops from 31° C. to −27° C. (P11→P12). A temperature of the refrigerant flowing through the compressor suction pipe 170 in the region of the regenerative heat exchanger 180 rises from 0° C. to 25° C. (P21→P22). Therefore, a heat exchange reversal region in which heat exchange between the capillary tube and the compressor suction pipe is reversed may occur in the region of the regenerative heat exchanger 180.

The heat exchange reversal region may be a factor that decreases efficiency of heat exchange and increases power consumption. In the drawing, the vertically extending arrow schematically indicates a region in which the regenerative heat exchanger 180 is provided.

The refrigerant passing through the point P12 may pass through the first evaporator 150. When the refrigerant passes through the first evaporator 150, the refrigerant is discharged at −20° C. from the point P13 and is introduced into the second evaporator 160. The refrigerant further evaporated by the second evaporator 160 is discharged at 0° C. from the point P14 at the outlet side of the second evaporator 160. The point P14 and the point P21 may be 0° C. as the same point.

FIG. 7 is a schematic view of temperature change in a refrigerant pipe and compressor suction pipe in the regenerative heat exchanger. Referring to FIG. 7, the heat exchange direction is reversed at a point T. It can be seen that the heat exchange reversal region is after the point T based on the progress direction of the capillary tubes.

In the heat exchange reversal region, cold air from the capillary tubes is transferred toward the compressor suction pipe. This phenomenon causes loss of heat exchange in the evaporator, and thus, should be avoided.

The refrigerating system may be reconfigured to remove the heat exchange reversal region, but this is difficult in terms of common use of production facilities and components. The structure in which the heat exchange reversal region itself disappears in the regenerative heat exchanger will be described hereinafter.

FIG. 8 is a partial view of a refrigerating system, in which a regenerative heat exchanger is exaggerated. Referring to FIG. 8, the regenerative heat exchanger 180 is shown with a dashed line. In the regenerative heat exchanger (SLHX: Suction Line Heat Exchanger), heat exchange may be performed in such a manner that the capillary tube and the compressor suction pipe come into contact with each other or are adjacent to each other.

Under the control of the three-way valve 130, the refrigerant may flow into at least one of the first capillary tube 140 or the second capillary tube 145. In the drawing, the refrigerant passing through the capillary tubes 140 and 145 may flow from top to bottom, that is, downward. The refrigerant discharged from the second evaporator 160 may flow through the compressor suction pipe 170.

The refrigerant flowing through the capillary tube and the refrigerant flowing through the compressor suction pipe flow counterflow and exchange heat with each other. As described above, the heat exchange reversal region may occur in the regenerative heat exchanger 180. Therefore, for the heat exchange reversal region, the refrigerant in the capillary tube and the refrigerant in the compressor suction pipe may not exchange heat with each other.

Based on the drawing, the regenerative heat exchanger 180 forms a heat exchange region A1 in which heat exchange is performed at an upper portion of point T, and a shielding region A2 in which heat exchange is shielded at a lower portion of point T. The heat exchange region A1 may be a geometric region from point T to the three-way valve. The shielding region A2 may be a geometric region from point T to the evaporator.

The temperature at the point T may fluctuate according to operating conditions of the cycle of the refrigerating system. The temperature at the point T may be within a range of −5° C. to 5° C.

A pipe length L1 of the shielding region A2 may be about 1 m. The point T may be placed at about 1 m from the outlet of the capillary tube and the inlet of the compressor suction pipe. That is, the shielding region may be included within about 1 m or less from the outlet of the capillary tube and the inlet of the compressor suction pipe.

In the shielding region A2, two pipe conduits may not come into contact with each other in order to shield heat exchange between the outlet of the capillary tube and the compressor suction pipe. For example, the two pipe conduits may not be welded together. In contrast, in the heat exchange region A1, two pipe conduits may be brought into contact with each other by a method, such as welding. However, in order to allow uniform heat exchange to be performed in the regenerative heat exchanger, indirect heat exchange with low heat exchange performance may be performed. In this case, it may be advantageous to prevent all the pipe conduits from being brought into contact with each other by a method, such as welding.

Due to the gliding temperature difference of the non-azeotropic mixed refrigerant, the heat exchange reversal region occurs not only in the serial bypass 1-compression 2-evaporation system, but also in the parallel 1-compression 2-evaporation system. Therefore, the shielding region A2 may be provided in the regenerative heat exchanger of the refrigerating system to which the non-azeotropic mixed refrigerant is applied. The parallel 1-compression 2-evaporation system may refer to a system in which an evaporator supplying cold air to the freezer compartment and an evaporator supplying cold air to the refrigerating compartment are connected in parallel to supply cold air to the freezer compartment and the refrigerating compartment.

Generation of a heat exchange reversal region in a parallel 1-compression 2-evaporation system will be described with reference to FIGS. 9 and 10.

FIG. 9 is a schematic view of an evaporator and a capillary tubes in a parallel 1-compression 2-evaporation system. FIG. 10A is a temperature graph explaining a heat exchange reversal region in a parallel 1-compression 2-evaporation system when a single refrigerant is used. FIG. 10B is a temperature graph explaining heat exchange reversal region in a parallel 1-compression 2-evaporation system when the non-azeotropic mixed refrigerant is used.

Referring to FIG. 9, the parallel 1-compression 2-evaporation system may include a refrigerant supplier 190 that branches the condensed refrigerant to two evaporators, and first evaporator 150 and second evaporator 160 that evaporate the refrigerant supplied from the refrigerant supplier 190 and supply cold air. The first evaporator 150 may be an evaporator that supplies cold air to the freezer compartment, and the second evaporator 160 may be an evaporator that supplies cold air to the refrigerating compartment.

As the refrigerant is the non-azeotropic mixed refrigerant, the temperature of the non-azeotropic mixed refrigerant rises due to the gliding temperature difference during evaporation. Therefore, the shielding region A2 may be provided in the regenerative heat exchanger 180.

It can be seen that there is no heat exchange reversal region in FIG. 10A, but the heat exchange reversal region is generated in FIG. 10B. As a result, in the case of the refrigerating system provided with the non-azeotropic mixed refrigerant and the regenerative heat exchanger, the shielding region is provided in the regenerative heat exchanger, thereby reducing power consumption.

Hereinafter, a method for controlling a refrigerating system using a non-azeotropic mixed refrigerant according to an embodiment will be described. In the following description, unless otherwise specified, embodiments may be applied as a method for controlling a refrigerating system using a non-azeotropic mixed refrigerant. In the following description, an apparatus having an internal space to which the refrigerating system according to embodiments is applied may be referred to as a "refrigerating apparatus".

FIG. 11 is a flowchart of a control method according to an embodiment. Referring to FIG. 11, when operation of the refrigerating apparatus starts, it is determined whether a temperature of a refrigerating compartment is in a satisfactory condition (state) (S1), and it is determined whether a temperature of a freezer compartment is in a satisfactory condition (state) (S2) (S3). Whether the temperature of each interior space is in a satisfactory condition may mean whether additional cold air has to be supplied. For example, when the condition is not satisfactory, it may be understood that more cold air needs to be supplied to the interior space.

When it is determined that both the freezer compartment and the refrigerating compartment need cold air, a freezer compartment/refrigerating compartment simultaneous operation mode may be performed. The freezer compartment/refrigerating compartment simultaneous operation mode may refer to a mode in which the refrigerating system operates such that cold air is supplied to both interior spaces. In the freezer compartment/refrigerating compartment simultaneous operation mode, the following operations may be performed.

First, three-way valve 130 may be controlled such that the refrigerant may be switched toward first evaporator 150 (S31). At this time, the first evaporator 150 may supply cold air to the freezer compartment. Cooling power remaining after evaporation in the first evaporator 150 (which may mean liquid refrigerant) may be evaporated in the second evaporator 160. The second evaporator 160 may supply cold air to the refrigerating compartment.

The compressor 110 may be operated at a frequency sufficient to supply the liquid refrigerant to both the first evaporator 150 and the second evaporator 160 (Cfr: C refers to the compressor, f refers to the freezer compartment, r refers to the refrigerating compartment, that is, the compressor may be used as a compressor for both the freezer compartment and the refrigerating compartment) (S32). In other words, the compressor may be operated at a compression frequency to supply a large amount of refrigerant and may provide a lot of cooling power to the evaporator.

It may be understood that a frequency of the compressor corresponds to a compression capacity of the compressor. For example, when the compression capacity is large, the compressor may be operated at a high frequency, and when the compression capacity is small, the compressor may be operated at a low frequency. However, the compression capacity of the compressor may be determined by the frequency of the compressor and a stroke of the piston. A main compression capacity of the compressor may be determined by frequency. In this specification, frequency of the compressor may be understood to correspond to the compression capacity of the compressor.

Both the freezer compartment fan (24a, see FIG. 4) for blowing the cold air of the refrigerant evaporated by the first evaporator 150 to the freezer compartment and the refrigerating compartment fan (25a, see FIG. 4) for blowing the cold air of the refrigerant evaporated by the second evaporator 160 to the refrigerating compartment may be operated (S33). The refrigerating compartment fan 25a and the freezer compartment fan blow 24a air to the corresponding evaporators, and cause convective heat transfer to a surface of the evaporator, thereby increasing an evaporation effect of the refrigerant.

For example, when there is no convective heat transfer on an outer surface of the evaporator, there may be only weak heat transfer due to natural convection. In this case, dew only forms on the surface of the evaporator, and evaporation of the refrigerant becomes weak. Therefore, operation of the fan blowing on the outer surface of the evaporator is required for operation of the evaporator. However, evaporation of the refrigerant by the evaporator is not completely impossible, and a certain level of refrigerant evaporation may occur. The present description is also applicable to the freezer compartment operation mode and the refrigerating compartment operation mode.

The operation of the three-way valve 130 (S31), the operation of the compressor 110 (S32), and the operation of the fan in the freezer compartment/refrigerating compartment simultaneous operation mode (S33) may all be performed together, or any one thereof may precede the other. Further, the operations need not necessarily be performed in the order of the operations presented in FIG. 11. For example, the fan may be operated to quickly blow the remaining cold air into the pipeline. After switching the three-way valve to a desired state, the compressor may be operated.

However, the order in embodiments may be performed. More specifically, after the three-way valve is controlled to adjust the desired refrigerant passage, the compressor may be operated. This is because the refrigerating system may be stably controlled without disturbing the flow of continuous fluid. It is advantageous in terms of reducing power consumption to operate the fan in a state in which the refrigerant is evaporated by the evaporator. The present description is also applicable to the freezer compartment operation mode and the refrigerating compartment operation mode.

An operation state when the freezer compartment/refrigerating compartment simultaneous operation mode is performed to reach a normal state will be described hereinafter.

In the freezer compartment/refrigerating compartment simultaneous operation mode, an inlet temperature of the first evaporator 150 may range from −30° C. to −25° C., an outlet temperature of the first evaporator may range from −25° C. to −20° C., an inlet temperature of the second evaporator 160 may range from −20° C. to −15° C., and an outlet temperature of the second evaporator may range from −5° C. to 0° C. Such an operation may be more accurately implemented by changing the temperature while the non-azeotropic mixed refrigerant is evaporated.

Next, when it is determined that only the freezer compartment needs cold air, the freezer compartment operation mode may be performed. In the freezer compartment operation mode, the refrigerating system is operated such that cold air is supplied only to the freezer compartment. The freezer compartment operation mode may be referred to as a "freezer compartment load response operation" because the refrigerating system is operated only in response to a load of the freezer compartment.

In the freezer compartment operation mode, the following operations may be performed.

First, the three-way valve 130 may be controlled such that the refrigerant may be switched toward the first evaporator 150 (S21). At this time, the first evaporator 150 may supply cold air to the freezer compartment. The refrigerant may all be evaporated by the first evaporator 150. In a transition period of a switching initial stage of the three-way valve 130, all of the refrigerant may not be evaporated by the first evaporator 150. Thereafter, it is possible to gradually evaporate all of refrigerant in the first evaporator 150.

In order to cause all of the refrigerant to be evaporated by the first evaporator 150, the following operation may be additionally performed in the freezer compartment operation mode.

The compressor 110 may be operated at a frequency sufficient to supply liquid refrigerant to only the first evaporator 150 (Cf: C refers to the compressor and f refers to the freezer compartment, that is, the compressor may be used as the compressor for the freezer compartment single operation mode) (S22). In other words, the compressor may be operated at a medium compression frequency to supply a medium amount of refrigerant, and cooling power may be provided only to the first evaporator.

The freezer compartment fan for blowing the cold air of the refrigerant evaporated by the first evaporator 150 to the freezer compartment may be operated maximally, and the refrigerating compartment fan for blowing the cold air of the refrigerant evaporated by the second evaporator 160 to the refrigerating compartment may not be operated (S23). The freezer compartment fan may be a variable speed fan in which a rotational speed thereof is varied in at least two steps. That is, the freezer compartment fan may correspond to at least two refrigerating system operation modes, and the rotational speed may be varied for each mode.

As the freezer compartment fan is operated at a maximum speed, it is possible to evaporate all of the refrigerant as much as possible such that cooling power is not supplied to the second evaporator 160. As described above, the compressor 110 may be operated so as to supply refrigerant corresponding to an amount capable of satisfying the cooling power supply. On the other hand, even when a small amount of the liquid refrigerant is supplied to the second evaporator 160, the refrigerating compartment fan is not operated, such that cold air is not supplied to the refrigerating compartment.

An operation state when the freezer compartment operation mode is performed to reach a normal state will be described. In the freezer compartment operation mode, the inlet temperature of the first evaporator 150 is set not to exceed −20° C. Therefore, it is weak cooling power compared to the freezer compartment/refrigerating compartment simultaneous operation mode, but it may be cooling power suitable for operation of the freezer compartment.

As the non-azeotropic mixed refrigerant has a gliding temperature difference, supply of cold air through the second evaporator may be reduced when the amount of liquid refrigerant is reduced. Therefore, a normal freezer compartment operation mode may be performed, and in the normal operation, the freezer compartment operation mode may be faithfully performed. In this case, cold air is not supplied to the refrigerating compartment.

Next, when it is determined that only the refrigerating compartment needs cold air, the refrigerating compartment operation mode may be performed. In the refrigerating compartment operation mode, the refrigerating system may be operated such that cold air is supplied only to the refrigerating compartment. The refrigerating compartment operation mode may be referred to as a "refrigerating compartment load response operation" because the refrigerating system is operated only in response to a load of the refrigerating compartment.

In the refrigerating compartment operation mode, the following operations may be performed.

First, the three-way valve 130 may be controlled such that the refrigerant may be switched toward the second evaporator 120 (S35). The second evaporator 160 may supply cold air to the refrigerating compartment. The refrigerant may be all evaporated by the second evaporator 160. In order to ensure that all refrigerant is evaporated by the second evaporator 160 and cold air is supplied only to the refrigerating compartment, the following operation may be additionally performed.

The compressor 110 may be operated at a frequency sufficient to supply liquid refrigerant to only the second evaporator 160 (Cr: C refers to the compressor and r refers to the refrigerating compartment, that is, the compressor may be used for the refrigerating compartment operation mode) (S36). In other words, the compressor may be operated at a low compression frequency to supply a small amount of refrigerant, and cooling power may be provided only to the second evaporator. In other words, as the refrigerant is not supplied to the first evaporator 150, the compressor may supply only refrigerant sufficient to evaporate to the second evaporator 160.

In order to ensure that the freezer compartment/refrigerating compartment simultaneous operation mode, the freezer compartment operation mode, and the refrigerating compartment operation mode are each performed, the compressor 110 may control an operation frequency in at least three stages and supply cooling power in at least three stages.

The refrigerating compartment fan for blowing the cold air of the refrigerant evaporated by the second evaporator 160 to the refrigerating compartment may be operated, and the freezer compartment fan for blowing the cold air of the refrigerant evaporated by the first evaporator 150 to the freezer compartment may not be operated (S37). Even when the refrigerating compartment fan does not operate at maximum, the liquid refrigerant may be filtered by a gas-liquid separator 165. Thus, the refrigerating compartment fan may not be operated at maximum. In the freezer compartment/refrigerating compartment simultaneous operation mode, the freezer compartment operation mode, and the refrigerating compartment operation mode, the cooling power supplied from the compressor is largest in the freezer compartment/refrigerating compartment simultaneous operation mode, is second largest in the freezer compartment operation mode, and is smallest in the refrigerating compartment operation mode.

Next, it may not be necessary to supply cold air to both the refrigerating compartment and the freezer compartment. In this case, a stop mode may be performed.

In the stop mode, first, the three-way valve 130 may be controlled such that refrigerant does not flow through the refrigerating system (S25). That is, operation of the refrigerating system may be stopped. In order to maintain stability of the refrigerating system even when the three-way valve 130 is stopped, the following operation may be additionally performed.

The compressor 110 may be turned off (S26). The freezer compartment fan and the refrigerating compartment fan corresponding to the evaporators 150 and 160 may not be operated (S27). The operation of the three-way valve 130 (S25), the operation of the compressor 110 (S26), and the operation of the fan (S27) in the stop mode may all be performed together, or any one thereof may precede the other.

It is not necessary to perform the operations in the order presented in FIG. 11. For example, it may be advantageous in terms of stably controlling the refrigerating system by stopping the compressor first to stop flow of continuous fluid and then control the three-way valve to prevent pressurization of the pipeline. By stopping the fan and then stopping the compressor and the three-way valve, it is possible to suppress excessive supply of cold air after achieving a desired temperature in the freezer compartment and the refrigerating compartment.

According to embodiments disclosed herein, as seen in the refrigerating compartment operation mode, the three-way valve is controlled to supply refrigerant only to the refrigerating compartment, thereby controlling the refrigerating compartment smoothly. Control of each component may be performed together with control of the three-way valve. In addition, as the refrigerating compartment operation mode is performed regardless of the operation of the freezer compartment, control instability and unnecessary interference are not generated.

According to embodiments disclosed herein, as seen in the freezer compartment/refrigerating compartment simultaneous operation mode, the gliding temperature difference of the non-azeotropic mixed refrigerant may be used together in the freezer compartment and the refrigerating compartment to supply cold air corresponding to target temperatures of the freezer compartment and the refrigerating compartment naturally without applying artificial external force.

According to embodiments disclosed herein, as seen in the freezer compartment operation mode, the three-way valve may used with at least one of various means of the compressor, the freezer compartment fan, or the refrigerating compartment fan. Therefore, it is possible to more quickly and accurately provide control states of the freezer compartment and the refrigerating compartment.

In the freezer compartment operation mode, an amount of liquid refrigerant supplied to the refrigerating compartment may be naturally controlled by an amount of non-azeotropic mixed refrigerant circulating through the refrigerating system. The supply amount of the refrigerant may be controlled by any one of an operation state of the compressor, more specifically, a frequency and stroke of the compressor. Therefore, there is an advantage of more stable control of the refrigerating system.

The three-way valve may perform the operation of switching or closing the flow direction of the non-azeotropic mixed refrigerant in any direction. Therefore, the three-way valve may be referred to as a "switching valve". The switching valve may also allow refrigerant to flow into components other than the two evaporators, for example, a third evaporator. In this case, configuration of the refrigerating system may be more diverse.

FIG. 12 is a flowchart of a method for controlling a refrigerating system using a non-azeotropic mixed refrigerant, according to another embodiment. Referring to FIG. 12, the compressor 110, the three-way valve 130, the freezer compartment fan, and the refrigerating compartment fan may be operated in response to the freezer compartment/refrigerating compartment simultaneous operation mode (S101). More specifically, the three-way valve 130 may supply the refrigerant to both the first evaporator 150 and the second evaporator 160. The compressor 110 may operate at a high frequency (Cfr). Both of the fans corresponding to the first evaporator and the second evaporator may be operated.

When the above-described operation state is continued for a predetermined period of time, the freezer compartment and the refrigerating compartment may approach target air conditioning states, respectively. Thereafter, when any one of the freezer compartment and the refrigerating compartment reaches the target air conditioning state, the fan that reaches the target air conditioning state is turned off (S102). Even when one of the fans is turned off, the other fan continues to operate, and the three-way valve and the compressor may operate in a same manner. When both the freezer compartment and the refrigerating compartment reach the target air conditioning states, all of the fans may be stopped and the refrigerating system may be stopped based on a stop mode (S103).

In embodiments disclosed herein, as much cooling power as possible is applied to the freezer compartment, the refrigerating compartment, and each component constituting the refrigerating system.

Embodiments disclosed herein may be used to prevent repetitive operation of a refrigerating system when the refrigerating system using a non-azeotropic mixed refrigerant is initially operated and a heat load of the refrigeration system is large. Embodiments disclosed herein may be used in emergency situations where compressor frequency or compression capacity of the refrigerating system is not variable. Embodiments disclosed herein may be applied to other refrigerating systems in which the three-way valve is not provided and the condenser and the first evaporator are directly connected in series.

FIG. 13 is a flowchart of a method for controlling a refrigerating system using a non-azeotropic mixed refrigerant, according to another embodiment. Referring to FIG. 13, compressor 110, three-way valve 130, the freezer compartment fan, and the refrigerating compartment fan may be operated in response to the freezer compartment/refrigerating compartment simultaneous operation mode (S201). More specifically, the three-way valve 130 may supply refrigerant to both the first evaporator 150 and the second evaporator 160. The compressor 110 may operate at a high frequency (Cfr). Both of the fans corresponding to the first evaporator and the second evaporator may be operated.

When the above-described operation state is continued for a predetermined amount of time, the freezer compartment or the refrigerating compartment may approach a target air conditioning state. When the freezer compartment reaches the target air conditioning state first, the freezer compartment fan may be turned off and the three-way valve may be switched to the refrigerating compartment. In contrast, when the refrigerating compartment reaches the target air conditioning state first, the refrigerating compartment fan may be turned off (S202). When both the freezer compartment and the refrigerating compartment reach the target air conditioning states, all of the fans may be stopped and the refrigerating system may be stopped based on a stop mode (S203).

In embodiments disclosed herein, as much cooling power as possible is applied to the freezer compartment, the refrigerating compartment, and each component constituting the refrigerating system, and the refrigerating compartment may be controlled more accurately. Embodiments disclosed herein may be used to prevent repetitive operation of the system when the refrigerating system using the non-azeotropic mixed refrigerant is initially operated and a heat load of the apparatus itself is large. Further, embodiments disclosed herein may be used in emergency situations where compressor frequency or compression capacity of the refrigerating system is not variable. Furthermore, embodiments disclosed herein may be applied in situations in which control of the refrigerating compartment is more important than control of the freezer compartment.

INDUSTRIAL APPLICABILITY

According to embodiments disclosed herein, when a non-azeotropic mixed refrigerant is used, a refrigerating system that implements various operation modes may be controlled more stably.

The invention claimed is:

1. A method for controlling a refrigerating apparatus including a non-azeotropic mixed refrigerant, the refrigerating apparatus including a first evaporator to supply cold air to a freezer compartment and a second evaporator to supply cold air to a refrigerating compartment, the first evaporator disposed upstream of the second evaporator in a direction of the non-azeotropic mixed refrigerant flow,
the method comprising:
operating a first operation in which includes, operating a compressor, operating a freezer compartment fan to blow air to the first evaporator, and operating a refrigerating compartment fan to blow air to the second evaporator;
in response to the freezer compartment reaching a first target temperature during the first operation or the refrigerating compartment reaching a second target temperature during the first operation, operating a second operation, the second operation including, continuously operating the compressor after the first operation, and stopping the freezer compartment fan or the refrigerating compartment fan corresponding to the freezer compartment that reaches the first target temperature or the refrigerating compartment that reaches the second target temperature, respectively; and
in response to the freezer compartment reaching the first target temperature during the second operation and the refrigerating compartment reaching the second target temperature during the second operation, operating a third operation, the third operation including, stopping both the refrigerating compartment fan and the freezer compartment fan after the second operation.

2. The method according to claim 1, wherein the refrigerating apparatus further includes a three-way valve disposed upstream of the first evaporator in a direction of the non-azeotropic mixed refrigerant flow to switch a flow direction of the non-azeotropic mixed refrigerant to one of the first evaporator and the second evaporator, the method comprises controlling the three-way valve to direct the non-azeotropic mixed refrigerant to the first evaporator in the first operation.

3. The method according to claim 2, wherein when the freezer compartment reaches the first target temperature first in the second operation, the method comprises controlling the three-way valve to direct the non-azeotropic mixed refrigerant to the second evaporator.

4. The method according to claim 2, wherein the compressor has a variable compression capacity, the method comprises operating the compressor with a first compression capacity having a high compression capacity among the variable compression capacity in the first operation.

5. The method according to claim 4, wherein when the freezer compartment reaches the first target temperature first in the second operation, the method comprises:
controlling the three-way valve to direct the non-azeotropic mixed refrigerant to the second evaporator; and
operating the compressor with a second compression capacity that is lower than the first compression capacity.

6. The method according to claim 5, wherein when the refrigerating compartment reaches the second target temperature first in the second operation, the method comprises:
maintaining the three-way valve in a state in which the non-azeotropic mixed refrigerant flows to the first evaporator; and
operating the compressor with a third compression capacity that is lower than the first compression capacity and higher than the second compression capacity.

7. The method according to claim 6, wherein the freezer compartment fan is a variable-speed fan having at least a first rotational speed and a second rotational speed which is faster than the first rotational speed, and when the refrigerating compartment reaches the second target temperature first in the second operation, the method comprises operating the freezer compartment fan at the second rotational speed.

8. The method according to claim 7, comprising operating the freezer compartment fan at the first rotational speed in the first operation.

9. The method according to claim 2, comprising controlling the three-way valve to direct the flow direction of the non-azeotropic mixed refrigerant after the non-azeotropic mixed refrigerant is condensed by a condenser.

10. The method according to claim 2, wherein the refrigerating apparatus comprises a first connection pipe that connects the three-way valve to the first evaporator, and a second connection pipe that connects the three-way valve to the second evaporator, and expanders are disposed in the first and second connection pipes, respectively.

11. A method for controlling a refrigerating apparatus, the refrigerating apparatus including a compressor to compress a non-azeotropic mixed refrigerant, a first evaporator and a second evaporator connected in series, the first evaporator to supply cold air to a freezer compartment and the second evaporator to supply cold air to a refrigerating compartment, the first evaporator disposed upstream of the second evaporator in a direction of the non-azeotropic mixed refrigerant flow, and a switch valve to switch a flow direction of the non-azeotropic mixed refrigerant to one of the first evaporator or the second evaporator, the switch valve disposed upstream of the first evaporator in a direction of the non-azeotropic mixed refrigerant flow, wherein the method comprises performing:
in response to a freezer compartment/refrigerating compartment simultaneous operation mode, controlling the switch valve in which the non-azeotropic mixed refrigerant is directed to the first evaporator and to the second evaporator to respectively supply the cold air to the freezer compartment and the refrigerating compartment;
in response to a freezer compartment operation mode, controlling the switch valve in which the non-azeotropic mixed refrigerant is directed to the first evaporator and the second evaporator; and
in response to a refrigerating compartment operation mode, controlling the switch valve in which the non-azeotropic mixed refrigerant is directed to the second evaporator to supply the cold air to the refrigerating compartment without passing through the first evaporator, wherein the compressor has at least three different operation compression capacities, wherein the method comprises:

in the freezer compartment/refrigerating compartment simultaneous operation mode, operating the compressor at a high compression capacity to provide a first amount of the non-azeotropic mixed refrigerant;

in the freezer compartment operation mode, operating the compressor at a medium compression capacity to provide a second amount of the non-azeotropic mixed refrigerant smaller than the first amount of the non-azeotropic mixed refrigerant; and in the refrigerating compartment operation mode, operating the compressor at a low compression capacity to provide a third amount of the non-azeotropic mixed refrigerant smaller than the second amount of the non-azeotropic mixed refrigerant, wherein the refrigerating apparatus comprises a freezer compartment fan being a variable-speed fan to blow air to the first evaporator, the variable-speed fan having a first rotational speed and a second rotational speed which is faster than the first rotational speed, the method comprises operating the freezer compartment fan at the second rotational speed in the freezer compartment operation mode, and wherein the freezer compartment fan operates at the second rotational speed, the second amount of the non-azeotropic mixed refrigerant is evaporated at the first evaporator to supply the cold air to the freezer compartment, during the freezer compartment operation mode.

12. The method according to claim 11, wherein in the freezer compartment/refrigerating compartment simultaneous operation mode, the non-azeotropic mixed refrigerant is evaporated in both the first evaporator and the second evaporator.

13. The method according to claim 11, wherein in the freezer compartment operation mode, the non-azeotropic mixed refrigerant is restricted from evaporation in the second evaporator.

14. A method for controlling a refrigerating apparatus including a non-azeotropic mixed refrigerant, the refrigerating apparatus including a compressor, a first evaporator and a second evaporator connected in series, the first evaporator to supply cold air to a freezer compartment and the second evaporator to supply cold air to a refrigerating compartment, the first evaporator disposed upstream of the second evaporator in a direction of the non-azeotropic mixed refrigerant flow, and a switch valve to switch a flow direction of the non-azeotropic mixed refrigerant to one of the first evaporator or the second evaporator, the switch valve disposed upstream of the first evaporator in a direction of the non-azeotropic mixed refrigerant flow, the method comprising:

determining whether a temperature of the freezer compartment satisfies a first target temperature and a temperature of the refrigerating compartment satisfies a second target temperature;

in response to the freezer compartment not reaching the first target temperature and the refrigerating compartment not reaching the second target temperature, controlling the switch valve such that the non-azeotropic mixed refrigerant flows to the first evaporator and the second evaporator;

in response to the freezer compartment reaching the first target temperature and the refrigerating compartment not reaching the second target temperature, controlling the switch valve such that the non-azeotropic mixed refrigerant flows to the second evaporator supplying cold air to a refrigerating compartment without passing through the first evaporator supplying cold air to a freezer compartment; and in response to the freezer compartment reaching a first target temperature and the refrigerating compartment reaching the second target temperature, stopping the compressor and closing the flow non-azeotropic mixed refrigerant by the switch valve.

15. The method according to claim 14, comprising in response to the freezer compartment reaching the first target temperature and the refrigerating compartment not reaching the second target temperature, performing a control such that the non-azeotropic mixed refrigerant is evaporated by the first evaporator and is restricted from evaporation by the second evaporator.

16. The method according to claim 15, comprising in response to the freezer compartment reaching the first target temperature and the refrigerating compartment not reaching the second target temperature, controlling the compressor to operate at a medium speed.

17. The method according to claim 15, wherein the refrigerating apparatus includes a freezer compartment fan being a variable-speed fan to blow air to the first evaporator, the variable-speed fan having a first rotational speed and a second rotational speed that is faster than the first rotational speed, and the method comprises when only the freezer compartment among the freezer compartment and the refrigerating compartment does not reach the target temperature, operating the freezer compartment fan at the second rotational speed.

18. The method according to claim 14, wherein in response to the freezer compartment reaching the first target temperature and the refrigerating compartment not reaching the second target temperature, operating the compressor is at a low speed.

* * * * *